United States Patent
Aoki

[11] Patent Number: 5,862,425
[45] Date of Patent: Jan. 19, 1999

[54] ELECTRONIC COLOR STILL VIDEO CAMERA HAVING ELECTRO-DEVELOPING RECORDING MEDIUM

[75] Inventor: Harumi Aoki, Tokyo, Japan

[73] Assignee: Asahi Kogaku Kogyo Kabushiki Kaisha, Tokyo, Japan

[21] Appl. No.: 592,484

[22] Filed: Jan. 26, 1996

[30] Foreign Application Priority Data

Jan. 26, 1995 [JP] Japan .................................... 7-030129

[51] Int. Cl.$^6$ .................................................. G03B 19/00
[52] U.S. Cl. .......................................... 396/429; 348/231
[58] Field of Search ............................. 348/64, 220, 231, 348/273, 276, 340, 342, 347, 350, 96, 98, 106, 110; 359/209, 506; 399/137, 151, 211, 221; 396/429, 30

[56] References Cited

U.S. PATENT DOCUMENTS

| | | | |
|---|---|---|---|
| 3,678,184 | 7/1972 | Kurokawa | 175/5.4 |
| 4,421,403 | 12/1983 | Sato et al. | 355/8 |
| 4,714,962 | 12/1987 | Levine | 358/209 |
| 4,755,880 | 7/1988 | Haenel et al. | 358/213.11 |
| 4,758,883 | 7/1988 | Kawahara et al. | 358/44 |
| 4,805,028 | 2/1989 | Nishioka et al. | 358/225 |
| 4,831,450 | 5/1989 | Sato et al. | 358/209 |
| 4,893,196 | 1/1990 | Koshiyouji et al. | 358/474 |
| 5,161,233 | 11/1992 | Matsuo et al. | 355/218 |
| 5,309,239 | 5/1994 | Bouwhuis | 348/265 |
| 5,315,410 | 5/1994 | Takanshi et al. | 358/471 |
| 5,389,966 | 2/1995 | Ikari et al. | 348/98 |
| 5,424,156 | 6/1995 | Aoki | 430/59 |
| 5,555,205 | 9/1996 | Okabe | 365/108 |
| 5,638,103 | 6/1997 | Obata et al. | 347/164 |

FOREIGN PATENT DOCUMENTS

| | | |
|---|---|---|
| 327236 | 9/1989 | European Pat. Off. . |
| 229081 | 1/1990 | Japan . |
| 3296014 | 12/1991 | Japan . |
| 52280 | 1/1993 | Japan . |
| 524706 | 4/1993 | Japan . |
| 5150251 | 6/1993 | Japan . |
| 6313894 | 11/1994 | Japan . |

*Primary Examiner*—Eddie C. Lee
*Assistant Examiner*—John Chizmar
*Attorney, Agent, or Firm*—Greenblum & Bernstein, P.L.C.

[57] ABSTRACT

An electronic color still video camera having an electro-developing recording medium and a color filter includes a photographing lens system for forming an optical image on the filter, an optical lens system for forming the optical image, formed on the filter, in an image-forming plane of the medium to record and develop the optical image therein, and an image reader for optically reading to obtain image data from the recorded and developed image of the medium. The image reader includes a light source having a light emitting surface arranged parallel with the image-forming plane of the medium such that light beams emitted from the light emitting surface of the source are perpendicularly directed to and are passed through the image-forming plane, and an image sensor having a light receiving surface oriented in the same direction as the light emitting surface of the source. The optical lens system is arranged such that the light beams passing through the image-forming plane of the medium are directed to and focused at the light receiving surface of the image sensor.

20 Claims, 19 Drawing Sheets

ELECTRONIC COLOR STILL VIDEO CAMERA HAVING ELECTRO-DEVELOPING RECORDING MEDIUM

BACKGROUND OF THE INVENTION

1. Field of the Invention

The present invention relates to an electronic color still video camera having an electro-developing recording medium in which an optical image obtained through a photographing lens system is electronically and directly recorded and developed as a visible image in very little time.

2. Description of the Related Art

Conventionally, silver halide photographic material is generally used as a material for recording an optical image. Silver halide photographic material has high optical sensitivity and high resolution, and the economical efficiency thereof is excellent. However, silver halide photographic material has drawbacks in that not only is the developing process cumbersome but also a visible image cannot be obtained at the same time that the photograph is taken. A dry-type developing method has been developed to simplify the developing process. However, simultaneous development in which a visible image is obtained upon photography is impossible in the dry-type developing method.

On the other hand, non-silver-halide photographic materials, such as electrophotographic materials, diazotype photographic materials and free-radical photographic materials, and so on are known. In these materials, however, there is no material which has advantageous characteristics like silver halide photographic material, while being able to simultaneously develop and keep a visible image. Note that, electrophotographic materials have been used mainly in copying machines, since they can perform dry-type development and can simultaneously develop an electrostatic latent image, which is obtained by exposure, using toner.

Recently, an electrophotographic material has been developed, in which an optical image can be electronically and directly recorded and developed as a visible image in no time, the image so developed being similar to one obtained in a silver halide photographic material. A recording medium formed of such a recording material, in which a visible image is electronically and directly recorded and developed, is referred to as an electro-developing recording medium hereinafter.

For example, Japanese Unexamined Patent Publication No. 5-2280 and U.S. Pat. No. 5,424,156 disclose one type of electro-developing recording medium comprising an electrostatic information recording medium and an electric charge keeping medium. The electrostatic information recording medium includes a photoconducting layer and an inorganic oxide material layer, and the electric charge keeping medium includes a liquid crystal display, both the mediums being combined to face each other with a small gap therebetween. In use, a voltage is applied between the electrostatic information recording medium and the electric charge keeping medium, and an optical image is formed on the electrostatic information recording medium during the application of the voltage. An electric charge distribution is produced over the electrostatic information recording medium in accordance with a light intensity distribution of the optical image formed thereon, so that the intensity of an electric field acts on the liquid crystal of the electric charge keeping medium in accordance with the electric charge distribution. Thus, an image derived from the optical image is reproduced in the electric charge keeping medium as a visible image. Namely, as soon as the optical image is formed on the electrostatic information recording medium, the image is developed in the electric charge keeping medium.

When the electric charge keeping medium is constituted as a memory type liquid crystal display, the developed visible image can be kept therein even if the electric field is eliminated from the electro-developing recording medium. In the memory type liquid crystal display, the developed image can be erased by heating it to a given temperature. In this case, the same electro-developing recording medium can be repeatedly used for photographing.

In an electronic still video camera having the electro-developing recording medium, there is necessarily provided an image reader comprising a CCD line sensor for electronically reading image signals from a developed image of the electro-developing recording medium, and the read image signals obtained from the CCD image sensor may be processed in various manners. For example, the read image signals may be stored in a second recording medium such as an IC memory card, a floppy disk, a hard disk or the like. Also, the read image signals may be transferred from the camera to an external processing device such as a computer, a TV monitor and so on.

The provision of the image reader results in the camera being bulky, because the image reader further comprises a light source for illuminating the developed image of the electro-developing recording medium, and an optical system for focusing the illuminated image at a light receiving surface of the CCD line sensor, and because the image reader must be moved such that the developed image of the electro-developing recording medium can be scanned with the light source associated with the CCD line sensor.

Furthermore, when the electronic still video camera having the electro-developing recording medium is constituted as an electronic color still video camera, a color filter having at least two different colors and being regularly arranged in a matrix-like manner must be provided in the vicinity of the electro-developing recording medium and therefore, the image reader. This results in a further bulkiness of the camera. Accordingly, it is desirable that the image reader and the color filter be compactly arranged for the electronic color still video camera's bulkiness to be reduced.

SUMMARY OF THE INVENTION

Therefore, an object of the present invention is to provide an electronic color still video camera having an electro-developing recording medium. The camera is arranged such that an image reader for electronically reading an image recorded and developed on the electro-developing recording medium is compactly arranged so that a size of the camera can become as small as possible.

In accordance with a first aspect of the present invention, there is provided an electronic color still video camera having an electro-developing recording medium and a color filter, comprising: photographing means for forming an optical image on the color filter; optical means for forming the optical image, formed on the color filter, in an image-forming plane of the electro-developing recording medium to record and develop the optical image therein; and image-sensing means for optically sensing to obtain image data from the recorded and developed image of the electro-developing recording medium. The image-sensing means includes a light source having a light emitting surface arranged parallel with the image-forming plane of the electro-developing recording medium such that light beams emitted from the light emitting surface of the light source are perpendicularly directed to and are passed through the image-forming plane of the electro-developing recording medium, and an image sensor having a light receiving surface oriented in the same direction as the light emitting surface of the light source. The optical means is constituted such that the light beams passing through the image-forming plane of the electro-developing recording medium are directed to and focused at the light receiving surface of the image sensor.

Preferably, the color filter is arranged so as to be included in an extension of the image plane of the electro-developing recording medium, and the optical means has a magnification ratio of one to one. Also, preferably, the image sensor of the image-sensing means is constituted as a line sensor, and the light source of the image-sensing means is constituted as a linear light source, and the line sensor and the linear light source is associated with each other such that they are relatively movable with respect to the electro-developing recording medium, whereby the image-forming plane thereof is scanned with the light beams emitted from the linear light source associated with the line sensor. More preferably, the line sensor and the linear light source may be supported by a carriage member which is movable with respect to the electro-developing recording medium, and the optical means is immovably provided with respect to the carriage member.

The line sensor may be arranged such that the light receiving surface thereof is included in a plane adjacent to the color filter. In this case, there is provided correction means for ensuring that the light beams passing through the image-forming plane of the electro-developing recording medium are focused at the light receiving surface of the image sensor.

The correction means may comprise an optical lens element provided on the line sensor so as to be cooperated with the optical means to ensure that the light beams passing through the image-forming plane of the electro-developing recording medium are focused at the light receiving surface of the image sensor. Also, the correction means may comprise a shifting means for shifting the electro-developing recording medium to ensure that the light beams passing through the image-forming plane of the electro-developing recording medium are focused at the light receiving surface of the image sensor. Further, the correction means may comprise a zoom-lens means incorporated in the optical means to ensure that the light beams passing through the image-forming plane of the electro-developing recording medium are focused at the light receiving surface of the image sensor.

On the other hand, the line sensor may be arranged such that the light receiving surface thereof is included in a plane in which the color filter is placed. A removal means is provided for removing the color filter from a position at which the optical image is formed on the filter by the photographing means, to keep the line sensor from being interfered with by the color filter, while the image-forming plane of the electro-developing recording medium is scanned with the light beams emitted from the linear light source associated with the line sensor.

The electro-developing recording medium may comprise an electrostatic information recording medium and an electric charge keeping medium. In this case, the electrostatic information recording medium includes a photoconducting layer and an inorganic oxide material layer, and the electric charge keeping medium includes a liquid crystal display. Preferably, the liquid crystal display comprises a memory type liquid crystal display.

In accordance with a second aspect of the present invention, there is provided an electronic color still video camera comprising: a first optical system for focusing and forming a first optical image on a first plane; a second optical system for focusing and forming the first optical image as a second optical image on a second plane; a color filter positioned in the first plane; an electro-developing recording medium positioned in the second position such that the second optical image is recorded and developed therein; and an image sensor being movable in the first plane for electronically sensing and reading from the recorded and developed image of the electro-developing recording medium through the second optical system, wherein the color filter is removable from the first plane during the sensing and reading of the recorded and developed image of the electro-developing recording medium by the image sensor.

In accordance with a third aspect of the present invention, there is provided an electronic color still video camera comprising: a first optical system for focusing and forming a first optical image on a first plane; a second optical system for focusing and forming the first optical image as a second optical image on a second plane; a color filter positioned in the first plane; an electro-developing recording medium positioned in the second position such that the second optical image is recorded and developed therein; and an image sensor being movable in a third plane for electronically sensing and reading from the recorded and developed image of the electro-developing recording medium through the second optical system, wherein the image sensor includes a correction lens for ensuring that an optical image deriving from the recorded and developed image of the electro-developing recording medium is focused and formed on a light receiving surface of the image sensor.

In accordance with a fourth aspect of the present invention, there is provided an electronic color still video camera comprising: a first optical system for focusing and forming a first optical image on a first plane; a second optical system for focusing and forming the first optical image as a second optical image on a second plane; a color filter positioned in the first plane; an electro-developing recording medium positioned in the second position such that the second optical image is recorded and developed therein; and an image sensor being movable in a third plane for electronically sensing and reading from the recorded and developed image of the electro-developing recording medium through the second optical system, wherein the electro-developing recording medium is movable from the second plane such that an optical image deriving from the recorded and developed image of the electro-developing recording medium is focused and formed on a light receiving surface of the image sensor.

In accordance with a fifth aspect of the present invention, there is an electronic color still video camera comprising: a first optical system for focusing and forming a first optical image on a first plane; a second optical system for focusing and forming the first optical image as a second optical image on a second plane; a color filter positioned in the first plane; an electro-developing recording medium positioned in the second position such that the second optical image is recorded and developed therein; and an image sensor being movable in a third plane for electronically sensing and reading from the recorded and developed image of the electro-developing recording medium through the second optical system, wherein the second optical system is adjustable such that an optical image deriving from the recorded and developed image of the electro-developing recording medium is focused and formed on a light receiving surface of the image sensor.

BRIEF DESCRIPTION OF THE DRAWINGS

These objects and other objects of the present invention will be better understood from the following description, with reference to the accompanying drawings in which.

DESCRIPTION OF THE PREFERRED EMBODIMENTS

Figure 1:
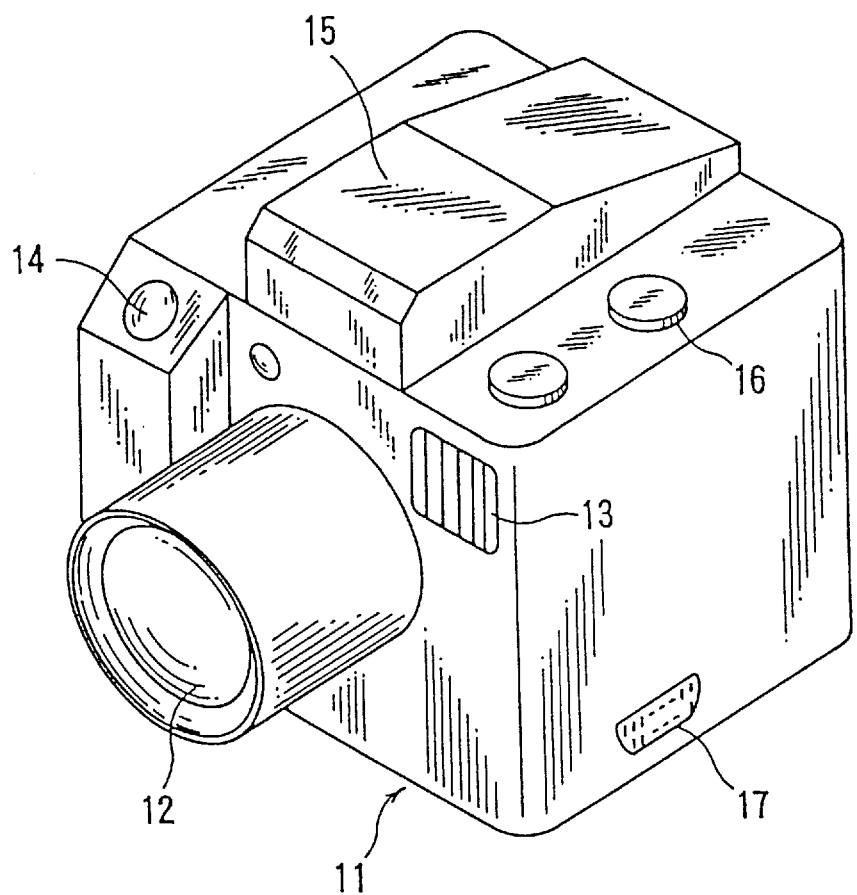
FIG. 1 is a schematic perspective view showing an appearance of a first embodiment of an electronic color still video camera according to the present invention.

FIG. 1 is an external view of a first embodiment of an electronic still video camera having an electro-developing recording medium, according to the present invention.

When viewing a camera body 11 from a front side thereof, a photographing optical system 12 is provided on approximately a central portion of a front surface of the camera body 11, and an electronic flash 13 is disposed on the front surface of the camera body 11 at a right side of and above the photographing optical system 12. A release switch 14 is provided on the side opposite to the electronic flash 13. On an upper surface of the camera body 11, a view finder 15 is provided at the center portion thereof, and operation switches including a scan start switch 16 are provided on a side of the view finder 15. On a side surface of the camera body 11, an output terminal connector 17 is provided at a lower portion thereof so that an image signal obtained by the camera can be outputted to an external recording device.

Figure 2:
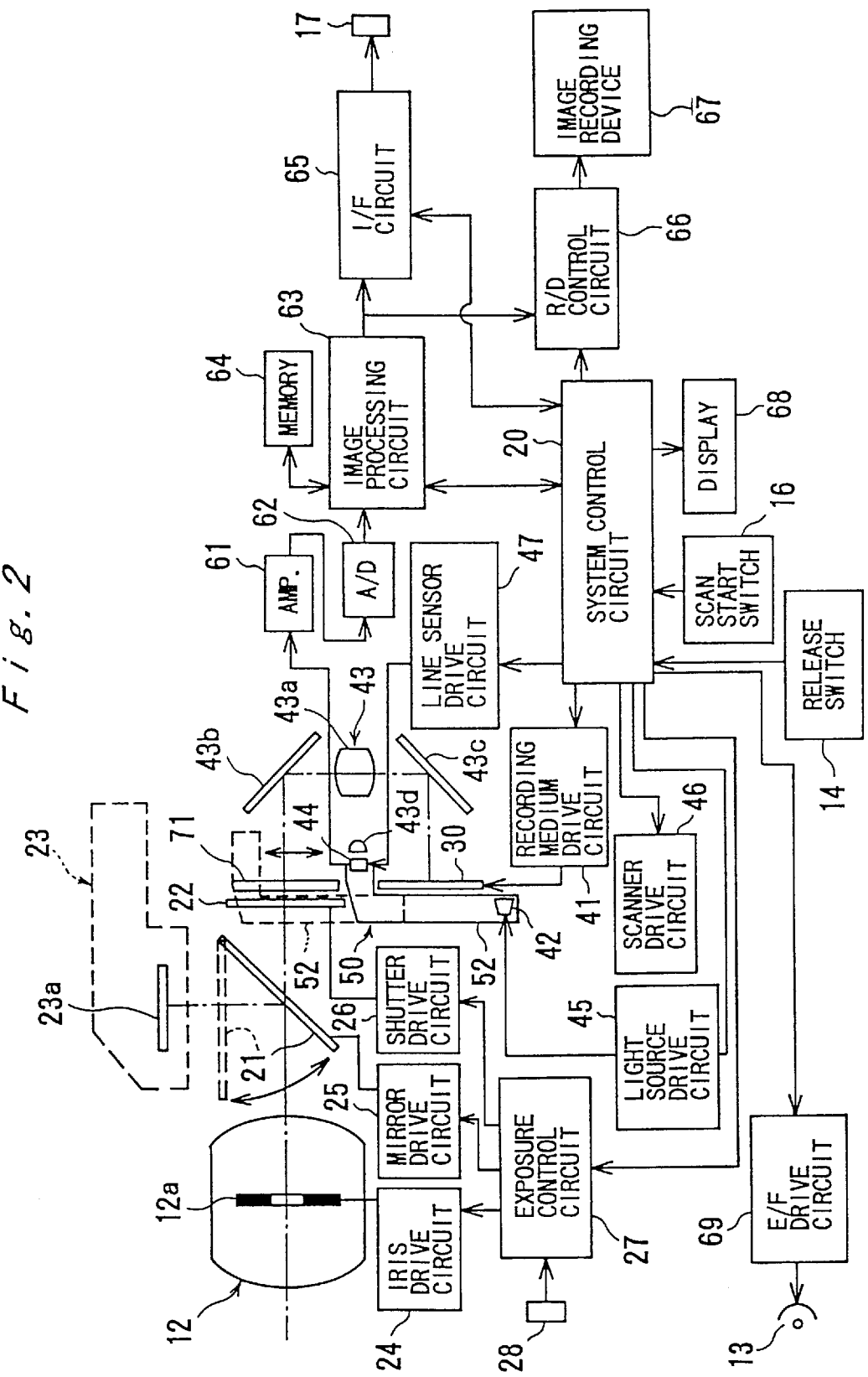
FIG. 2 is a block diagram of the electronic color still video camera shown in FIG. 1.

FIG. 2 shows a block diagram of the still video camera as mentioned above, in which a system control circuit 20 including a micro-computer or micro-processor is provided to control the still video camera as a whole.

The photographing optical system 12 has a plurality of lens groups and an aperture 12a. A color filter 71 is disposed behind the photographing optical system 12. A quick return mirror 21 is placed between the photographing optical system 12 and the color filter 71. A shutter 22 is provided between the quick return mirror 21 and the color filter 71. A focusing glass 23a, included in a view finder optical system 23, is disposed above the quick return mirror 21.

The aperture 12a, the quick return mirror 21 and the shutter 22 are driven by an iris drive circuit 24, a mirror drive circuit 25 and a shutter drive circuit 26, respectively. These drive circuits 24, 25 and 26 are controlled by an exposure control circuit 27 which is energized in accordance with a command signal outputted by the system control circuit 20.

While an exposure is controlled, an opening degree of the aperture 12a is adjusted by the iris drive circuit 24 under control of the exposure control circuit 27, based on an output signal of a photometry sensor 28.

The quick return mirror 21 is usually set to a down position (an inclining position shown by the solid line in the drawing), and thus light beams passing through the photographing optical system 12 are led to the view-finder optical system 23, so that an object to be photographed can be observed by a photographer. When a photographing operation is carried out, the quick return mirror 21 is rotated upward by the mirror drive circuit 25, and is then set to an up position (a horizontal position shown by the broken line in the drawing), so that the light beams are directed to the shutter 22.

An electro-developing recording medium 30 is positioned below the color filter 71. An optical system 43 is immovably provided behind the color filter 71 and the electro-developing recording medium 30. The optical system 43 includes a converging lens or image-forming lens 43a, and a pair of total reflecting mirrors or reflectors 43b and 43c associated therewith.

The shutter 22 is usually closed. Upon performing a photographing operation, the shutter 22 is opened over a given period of time by the shutter drive circuit 26, under control of the exposure control circuit 27. Thus, during the photographing operation, the light beams passing through the photographing optical system 12 and the shutter 22 are led to the reflector 43b of the optical system 43 through the color filter 71, and are reflected toward the image-forming lens 43a of the optical system 43. The light beams passing through the image-forming lens 43a are then directed to the reflector 43c of the optical system 43, and are reflected toward the electro-developing recording medium 30, resulting in forming a two-dimensional optical image thereon.

A voltage is applied to the electro-developing recording medium 30 under control of a recording medium drive circuit 41. By exposing the electro-developing recording medium 30 while applying the voltage, an image formed by the photographing optical system 12 is recorded and developed on the electro-developing recording medium 30 as a visible image. Note that the recording medium drive circuit 41 is energized in accordance with a command signal outputted by the system control circuit 20.

An image reader or scanning mechanism 50 is provided in the camera body 11 in the vicinity of the electro-developing recording medium 30, and executes a scanning operation for electronically reading a developed image of the electro-developing recording medium 30. The scanning mechanism 50 comprises a linear light source 42 and a line image sensor 44 which are supported by a carriage member 52. The linear light source 42 includes an LED (light emitting diode) array or a plurality of light emitting diodes aligned with each other, and a collimating lens for converting the light beams, emitted therefrom, into parallel light beams. These elements are arranged so as to form a linear light emitting surface. The line sensor 44 comprises a one-dimensional CCD sensor having, for example, 2,000 pixels and forming a linear light receiving surface. The line sensor 44 serves as a photoelectric-conversion device for sensing and converting an optical image into electric pixel signals. The light source 42 and the line sensor 44 are arranged on the carriage member 52 such that the respective light emitting and light receiving surfaces thereof are oriented in the same rearward direction.

The carriage member 52 carrying the light source 42 and the line sensor 44 is movable between a lower position, shown by a solid line, and an upper position, shown by a broken line. When an operation other than the scanning operation for obtaining the pixel signals from the image recorded on the electro-developing recording medium 30 is executed, for example, when the photographing operation is executed, the carriage member is at the lower position. When the scanning operation is initiated, the carriage member 52 is moved from the lower position to a scanning start position, and then is intermittently moved from the scanning start position toward the upper position such that the developed image of the electro-developing recording medium 30 is scanned with the linear light source 42 during the scanning operation. Of course, the light source 42 and the line sensor 44 may be of suitable length to completely cover and extend over one horizontal scanning line of the image formed on the electro-developing recording medium 30. A linear segment of the image developed by the electro-developing recording medium 30 is illuminated by the linear light emitting surface of the light source 42, and is focused on the light receiving surface of the line sensor 44 by the optical system 43. Namely, it can be said that the optical system 43 for directing the light beams, passing through the photographing optical system 12 and the shutter 22, to the electro-developing recording medium 30, forms a part of the scanning mechanism 50.

ON and OFF control of the light source 42 is performed by a light source drive circuit 45. Reading of the pixel signals from the line sensor 44 is controlled by a line sensor drive circuit 47. Movement of the scanning mechanism 50 is controlled by a scanner drive circuit 46. The drive circuits 45, 46 and 47 are operated by the system control circuit 20.

The pixel signals sensed and read out of the line sensor 44 are amplified by an amplifier 61, and are then converted to digital pixel signals by an analog-digital (A/D) converter 62. The digital pixel signals are subjected to a shading correction, a gamma correction and so on, by an image processing circuit 63 under control of the system control circuit 20, and are then temporarily stored in a memory 64. The memory 64 may include an EEPROM having correction data for the shading correction. Note, the memory 64 may have a capacity for storing a single-line of digital pixel signals outputted from the line senor 44 or may have a capacity for storing a single-frame of digital pixel signals obtained by a completion of the scanning operation of the scanning mechanism 50.

The pixel signals outputted from the memory 64 may be optionally inputted into an interface circuit 65 through the image processing circuit 63. In this case, the pixel signals are subjected to a given processing such as a format-conversion processing and so on, and are then outputted to, for example, an external monitor device (not shown) through the output terminal connector 17. Also, the pixel signals outputted from the image process circuit 63 may be recorded on a second recording medium, such as, for example an IC memory card, a floppy disk, a detachable hard disk or the like, in an image recording device 67 therefor. The pixel signals read out of the second recording medium may be transferred to an external processing device such as a personal computer, if necessary. In this case, the pixel signals are subjected to a given processing such as an image-compression processing and a format-conversion processing in a recording device control circuit 66. The interface circuit 65 and the recording device control circuit 66 are energized in accordance with a command signal outputted from the system control circuit 20.

The release switch 14 and the scan start switch 16 are connected to the system control circuit 20, and the photographing operation and the scanning operation as mentioned above are executed by turning the switches ON. A display device 68, which may be constituted as an LCD (liquid crystal display) panel, is provided on a rear surface of the camera body 11 at a suitable location thereof, and is connected to system control circuit 20 to display various setting conditions of the still video camera, suitable massages and so on. Also, an electronic flash drive circuit 69 is connected to the system control circuit 20 to control a flashing operation of the electronic flash 13.

Figure 3:
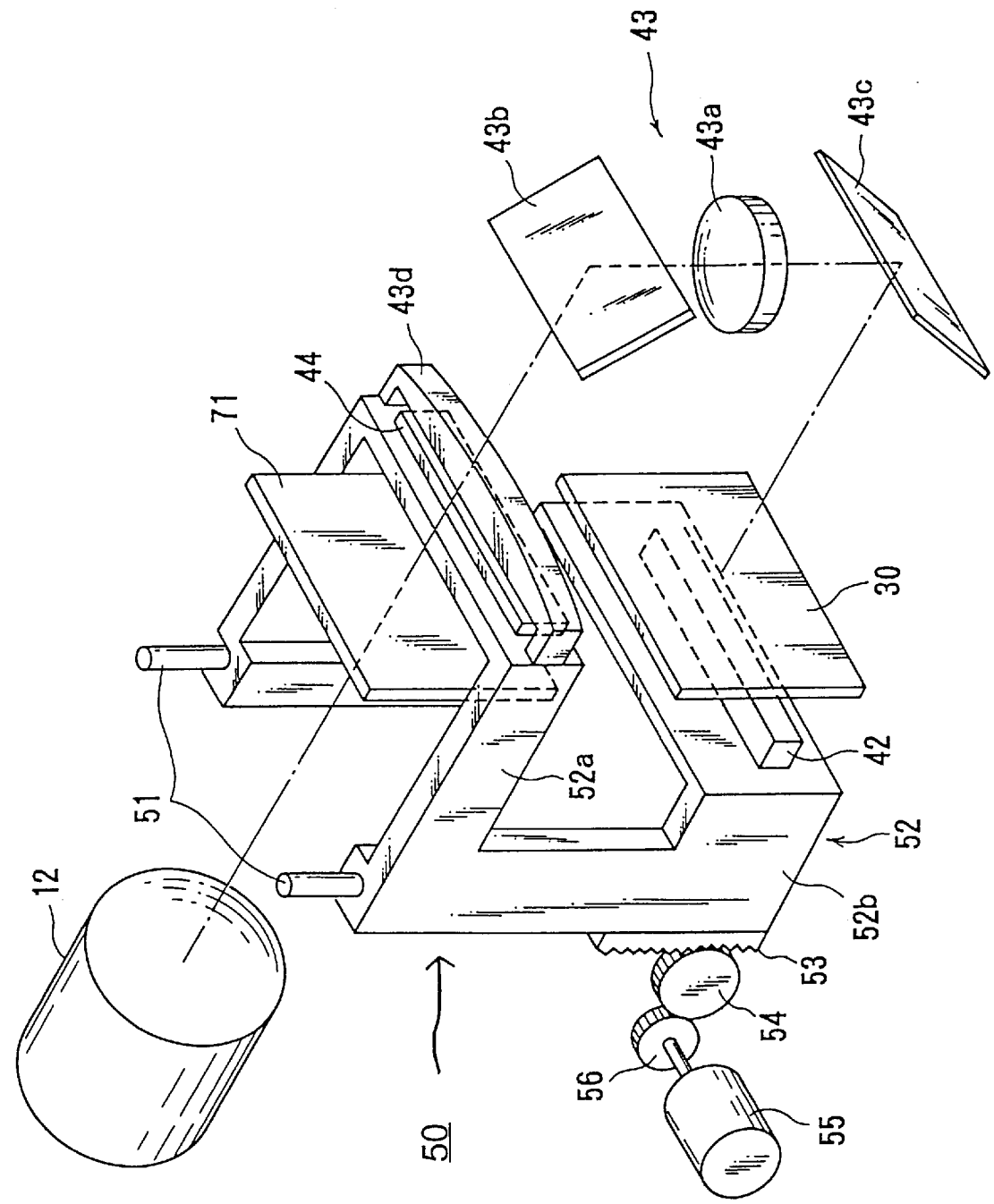
FIG. 3 is a schematic perspective view showing an image reader or scanning mechanism used in the electronic color still video camera shown in FIGS. 1 and 2.

FIG. 3 shows the arrangement of the scanning mechanism 50 and elements provided therearound. As shown in this drawing, the carriage member 52 is slidably supported by a pair of guide shafts 51, 51, and the carriage member 52 includes a first or upper U-shaped support portion 52a, and a second or lower U-shaped support portion 52b disposed therebelow. The first support portion 52a is extended farther rearward than is the second support portion 52b. The carriage member 52 has a rack 53 fixed thereto, and the rack 53 is engaged with a pinion 54 which is meshed with a gear 56 securely mounted on an output shaft of a scan drive motor 55, such as a stepping motor, a servo-motor or the like. The scan drive motor 55 is driven by the scanner drive circuit 46 (FIG. 2).

The line sensor 44 is securely attached to a rear face of the first support portion 52a such that the light receiving surface thereof is oriented rearwardly, and is provided with a correction lens 43d attached to the rear face thereof so as to cover the light receiving surface of the line sensor 44. Note, the correction lens 43d forms a part of the optical system 43 provided behind the color filter 71 and the electro-developing recording medium 30. The linear light source 42 is attached to a rear face of the second support portion 52b such that the light emitting surface thereof is oriented rearwardly. Namely, the light receiving surface of the line sensor 44 and the light emitting surface of the light source are oriented in the same direction.

Figure 4:
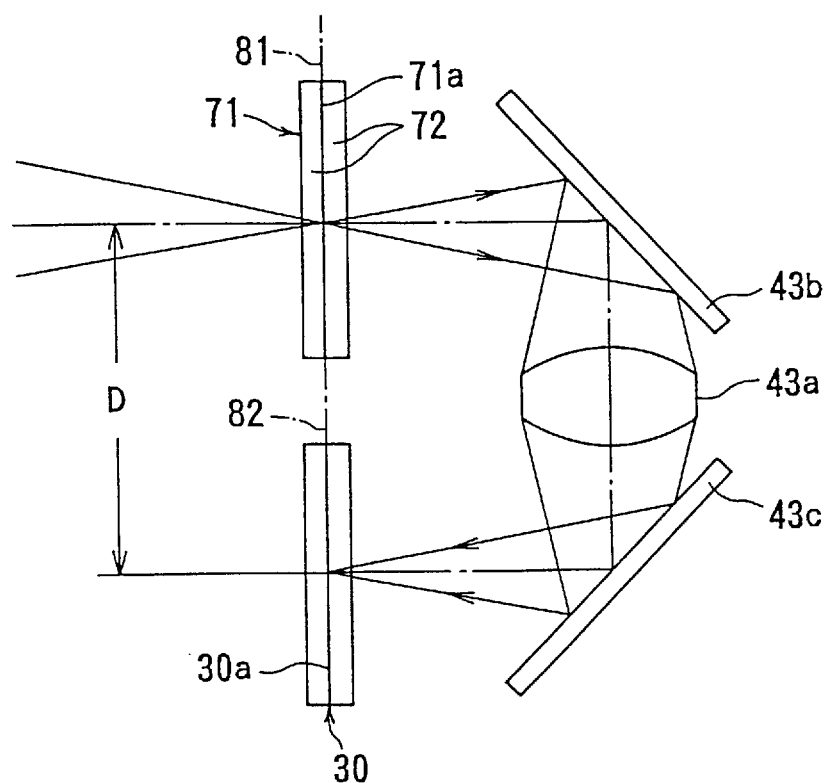
FIG. 4 is a schematic view showing an arrangement of a color filter, an electro-developing recording medium, and an optical system forming a part of the image reader or scanning mechanism.
Figure 5:
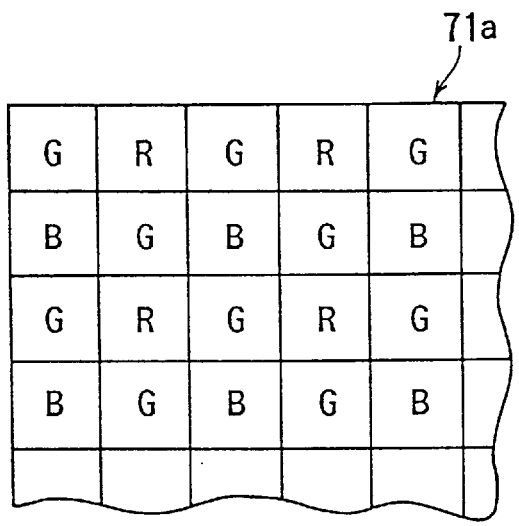
FIG. 5 is a schematic view enlargedly showing a part of a regular arrangement of different color filter elements of the color filter shown in FIG. 4.

As shown in FIG. 4, the color filter 71 comprises a pair of transparent substrates 72, 72, and a color film 71a sandwiched therebetween. The color film 71a includes color filter elements having at least two different colors and regularly arranged in a matrix-like manner. In this embodiment, as shown in FIG. 5, the color film 71a is constituted as a three-primary-color film including a plurality of three different color filter elements corresponding to red, green, and blue indicated by references R, G, and B. and the color filter elements R, G, and B are regularly arranged. Namely, in each of the odd lateral rows of the matrix arrangement, the green and red filter elements G and R are alternately arranged, and, in each of the even lateral rows of the matrix arrangement, the green and blue filter elements G and B are alternately arranged. In FIG. 4, reference 81 indicates a first focal plane on which an optical image is formed by the photographing optical system 12, and the color filter 71 is disposed such that the three-primary-color film 71a thereof is included in the first focal plane 81.

Also, as shown in FIG. 4, the electro-developing recording medium 30 has an image-forming plane 30a in which a developed image is formed and held, and the image-forming plane 30a is presented by a film-like liquid crystal layer included in the electro-developing recording medium 30. Reference 82 indicates a second focal plane on which an optical image is formed by the optical system 43, and the electro-developing recording medium 30 is disposed such that the image-forming plane 30a thereof is included in the second focal plane 82.

In this embodiment, the first focal plane 81 is defined by both the photographing optical system 12 and the optical system 43, and the second focal plane 82 is defined by the optical system 43, with the first and second focal planes 81 and 82 being consistent with each other.

As is apparent from FIG. 4, the color filter 71 and the electro-developing recording medium 30 are aligned with each other such that the three-primary-color film 71a of the former is consistent with the image-forming plane 30a of the latter. Also, the color filter 71 and the electro-developing recording medium 30 are spaced from each other such that a distance between the centers thereof is D.

The optical system 43 has a magnification ratio of one, and is constituted such that an image formed on one of the first and second focal planes 81 and 82 is focused and formed on the other focal plane. In particular, the image-forming lens 43a is arranged such that an optical axis thereof is perpendicular with respect to the optical axis defined by the photographing optical system 12, and the reflectors 43a and 43c are symmetrically arranged at both the sides of the image-forming lens 43a with respect to the center thereof, and are inclined so as to define an angle of 45 degrees (or 135 degrees) with respect to the optical axis of the image-forming lens 43a. A distance between the centers of the reflectors 43b and 43c of the optical system 43 corresponds to the distance D between the linear light source 42 and the line sensor 44. The reflectors 43b and 43c are sufficiently extended so as to cover the image-forming plane 30a of the electro-developing recording medium 30.

When the photographing operation is executed, the carriage member 52 is at the lower position (FIG. 2) so that the line sensor 44 is removed from the optical path defined by the photographing optical system 12, as shown in FIG. 4. During the photographing operation, the light beams passing through the photographing optical system 12 and the shutter 22 are focused on the three-primary-color film 71a of the color filter, and are then led to the reflector 43b of the optical system 43. Note, the light beams passing through the color filter 71 carry color image information. Then, the reflector 43b reflects the light beams, carrying the color image information, toward the image-forming lens 43a, and the light beams passing through the image-forming lens 43a are led to the reflector 43c of the optical system 43. The reflector 43c reflects the light beams toward the electro-developing recording medium 30, so that the optical image carrying the color image information is recorded and developed on the electro-developing recording medium 30.

Figure 6:
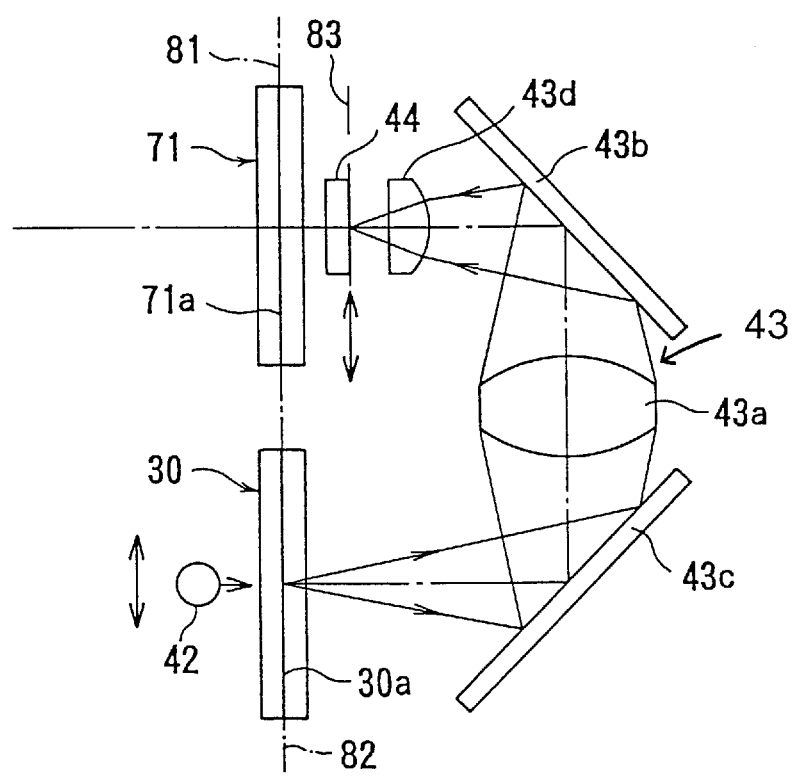
FIG. 6 is a schematic view similar to FIG. 4, further showing elements other than the optical system of the image reader or scanning mechanism.

When the scanning operation is executed, the carriage member 52 is moved from the lower position to the scanning start position. Then, the carriage member 52 is intermittently moved from the scanning start position toward the upper position. During the scanning operation, the electro-developing recording medium 30 is scanned with the light beams emitted from the linear light emitting surface of the light source 42. As shown in FIG. 6, the light beams passing through the electro-developing recording medium 30 are directed to the reflector 43c, and then reflected toward the image-forming lens 43a. The light beams passing through the image-forming lens 43a are directed to the reflector 43b, and reflected toward the line sensor 44. The light beams directed toward the line sensor 44 by the reflector 43b are focused on the light receiving surface thereof due to the correction lens 43d forming a part of the optical system 43. In particular, in FIG. 6, reference 83 indicates a third focal plane on which an optical image is formed by the correction lens 43d, and the line sensor 44 is disposed such that the light receiving surface thereof is included in the third focal plane 83. Namely, the correction lens 43d is cooperated with the image-forming lens 43a such that an aerial image formed on the first focal plane 81 by the image-forming lens 43a is shifted to the third focal plane 83.

If the correction lens 43d is not provided, the light beams reflected by the reflector 43b are focused on the first focal plane 81 or the three-primary-color film 71a of the color filter 71, and thus the focused image cannot be obtained on the light receiving surface of the line sensor 44.

The pitch of the lateral arrangement of the color filter elements in each of the lateral rows (FIG. 5) must be consistent with and correspond to that of the pixel-arrangement of the one-dimensional CCD line sensor 44 before the color image information can be properly sensed and read by the line sensor 44. Nevertheless, in this embodiment, the pitch of the lateral arrangement of the color filter elements in each of the lateral rows is not equal to that of the pixel-arrangement of the one-dimensional CCD line sensor 44, because a magnification of the image focused formed on the light receiving surface of the line sensor 44 by the correction lens 43d is not one with respect to the optical image focused and formed on the three-primary-color film 71a of the color filter 71 by the photographing optical system 12, due to the intervention of the correction lens 43d between the reflector 43b and the line sensor 44. Namely, the pitch of the lateral arrangement of the color filter elements and/or the pitch of the the pixel-arrangement of the line sensor 44 are arranged and revised so that a consistency and correspondence can be obtained therebetween.

Figure 7:
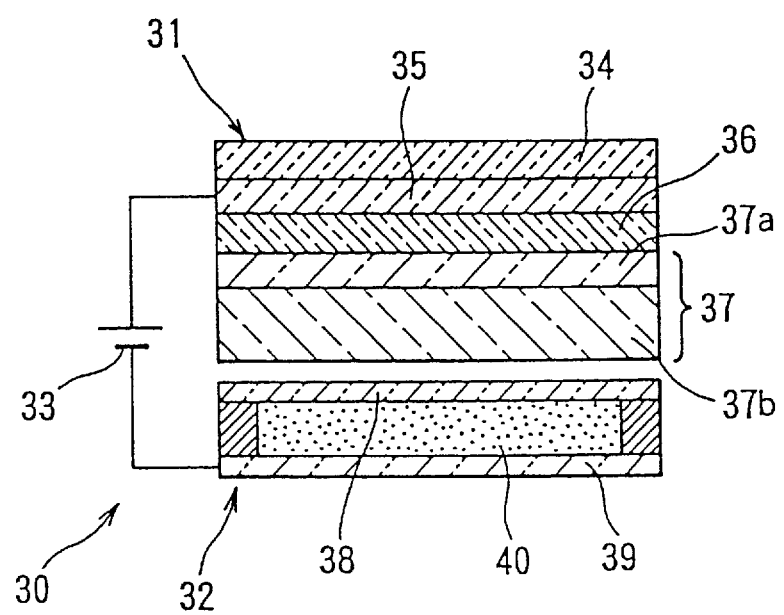
FIG. 7 is a schematic sectional view showing the electro-developing recording medium shown in FIG. 4.

FIG. 7 shows a structure of the electro-developing recording medium 30, which is identical with that disclosed in Japanese Unexamined Patent Publication No. 5-2280 and U.S. Pat. No. 5,424,156, the disclosures of which are expressly incorporated herein by reference in their entirety.

The electro-developing recording medium 30 comprises an electrostatic information recording medium 31 and an electric charge keeping medium 32, and a voltage is applied therebetween by an electric power source 33, illustrated symbolically in FIG. 7. The electric power source 33 corresponds to the recording medium drive circuit 41, and a recording medium activating signal (a voltage signal) is applied from the recording medium drive circuit 41 (i.e., the electric power source 33) to the electro-developing recording medium 30 during the photographing operation.

The electrostatic information recording medium 31 is formed by laminating a base plate 34, an electrode layer 35, an inorganic oxide material layer 36 and a photoconducting layer 37. The photoconducting layer 37 is formed by laminating an electric charge generating layer 37a and an electric charge transferring layer 37b. The electric charge keeping medium 32 is formed by confining liquid crystal 40 between a liquid crystal supporting plate 38 and a liquid crystal electrode layer 39. Namely, the liquid crystal 40 is confined as a film-like layer between the supporting plate 38 and the electrode layer 39, and this film-like liquid crystal forms the image-forming plane 30a (FIGS. 4 and 6). The electric charge transferring layer 37b of the photoconducting layer 37 and the liquid crystal supporting plate 38 of the electric charge keeping medium 32 face each other with a small gap therebetween. Note, as is apparent from FIG. 7, the whole structure of the electro-developing recording medium 30 is transparent.

When the electric power source 33 is turned ON, or when the recording medium drive circuit 41 is energized, a voltage signal or recording medium activating signal is applied between the electrostatic information recording medium 31 and the electric charge keeping medium 32, i.e., between the electrode layer 35 and the liquid crystal electrode layer 39. When an optical image is formed on the electrostatic information recording medium 31 by the photographing optical system 12 during the application of the voltage signal, an electric charge distribution is produced over the electrostatic information recording medium 31 in accordance with a light intensity distribution of the optical image formed thereon, so that the intensity of an electric field acts on the liquid crystal 40 of the electric charge keeping medium 32 in accordance with the electric charge distribution. Thus, an image derived from the optical image is reproduced in the liquid crystal 40 as a visible image. Namely, as soon as the optical image is formed on the electrostatic information recording medium 31, the image is developed in the electric charge keeping medium 32.

In this embodiment, since the electric charge keeping medium 32 is constituted as a memory type liquid crystal display, the developed visible image can be kept therein even if the electric field is eliminated from the electro-developing recording medium 30. In the memory type liquid crystal display, the developed image can be erased by heating it to a given temperature, using a suitable heater. In this case, the same electro-developing recording medium 30 can be repeatedly used for photographing.

Figure 8:
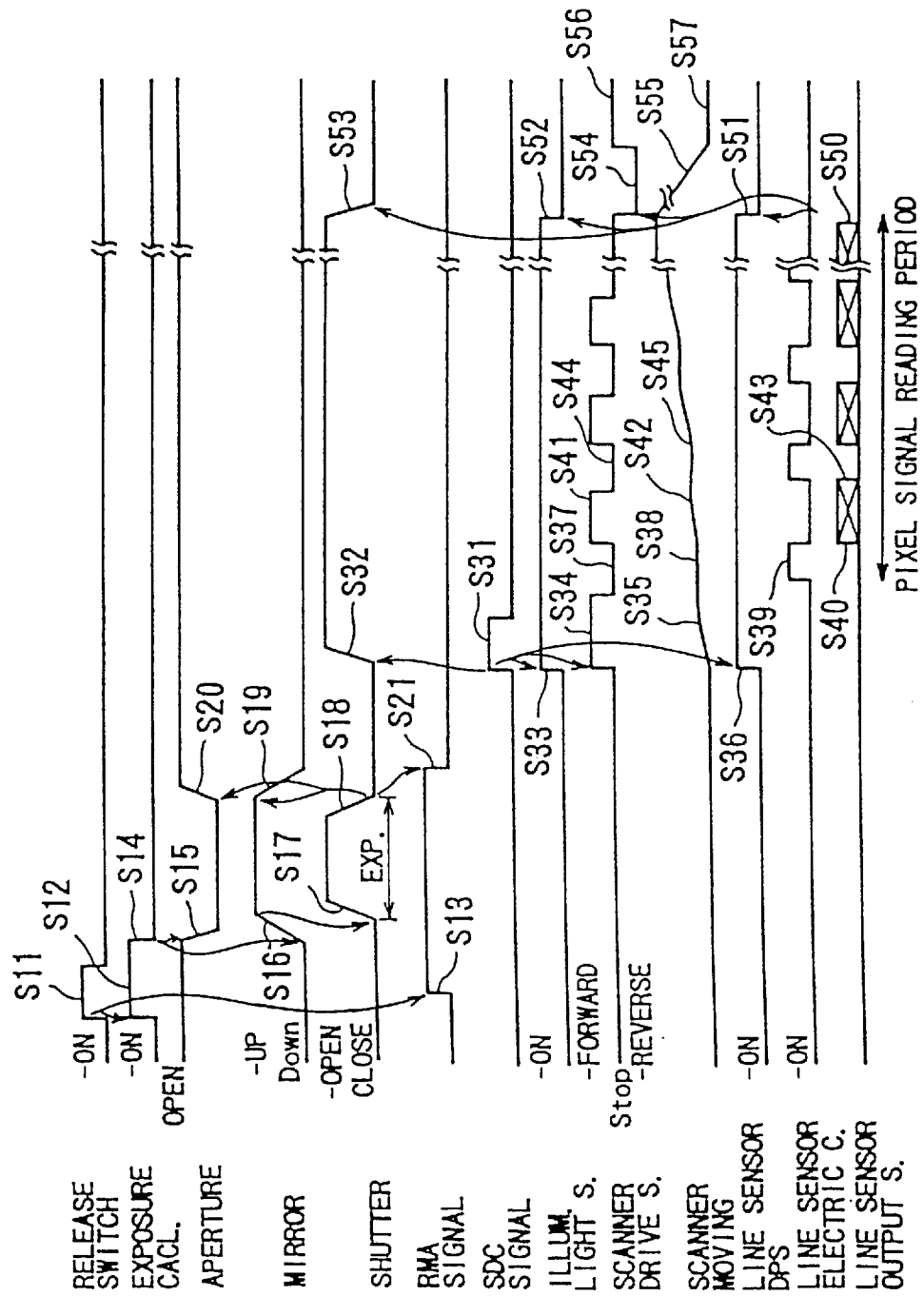
FIG. 8 is a timing chart for explaining a whole operation of the electronic color still video camera shown in FIGS. 1 and 2.
Figure 9:
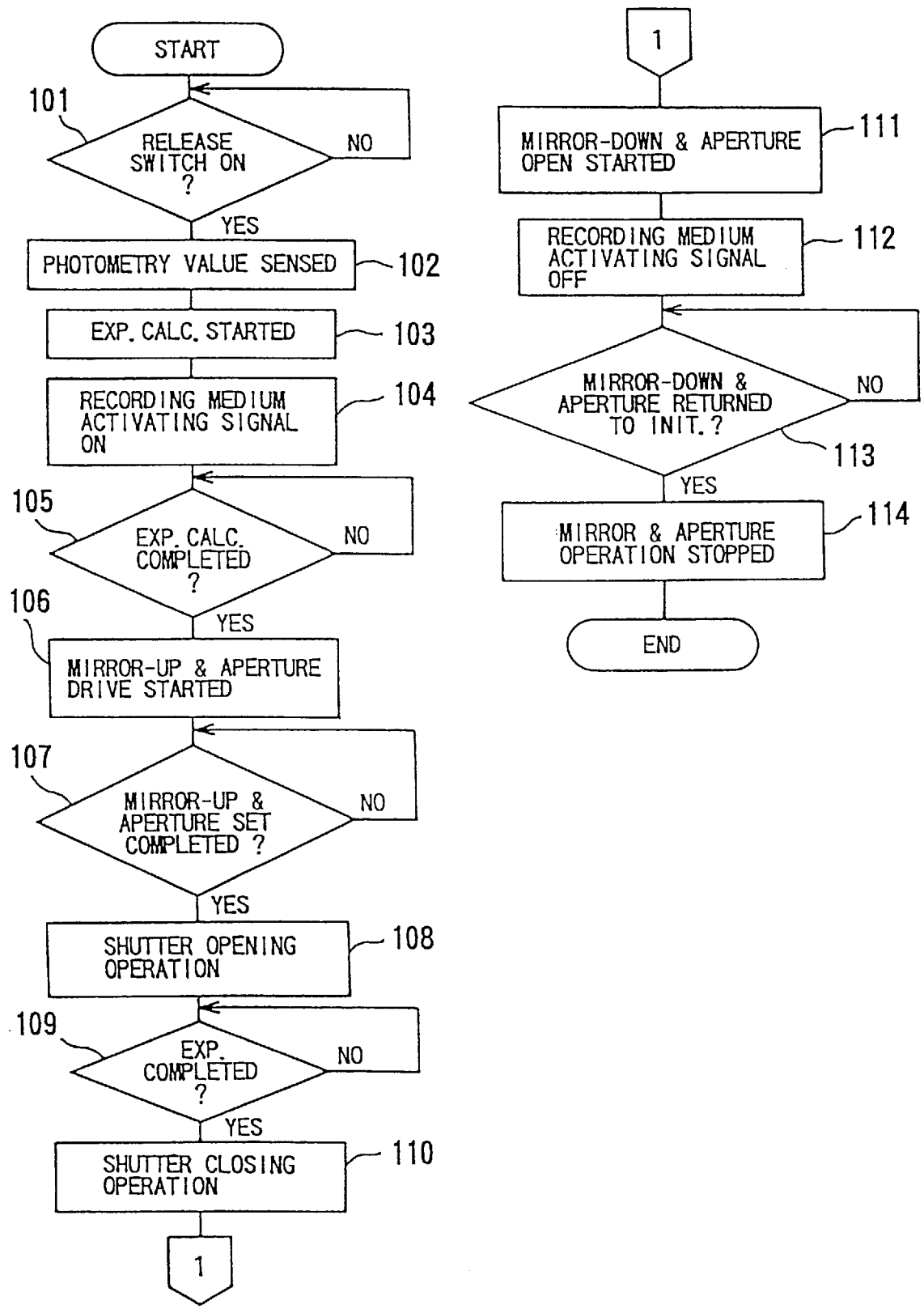
FIG. 9 is a flowchart for explaining a photographing operation of the electronic still video camera shown in FIGS. 1 and 2.

FIG. 8 shows a timing chart for explaining a whole operation of the camera, and FIG. 9 shows a flowchart for explaining a photographing operation of the camera. With reference to these drawings, the photographing operation will be explained below.

At step 101, it is determined whether or not the release switch 14 has been turned ON. If the turn-ON of the release switch 14 has been carried out, a command signal for executing the photographing operation is made ON (reference "S11" in FIG. 8), and is inputted to the system control circuit 20.

At step 102, an output signal of the photometry sensor 28, i.e., a photometry value, is sensed and fetched by the system control circuit 20, and then the control proceeds to step 103, in which an exposure calculation is started based on the fetched photometry value (reference "S12" in FIG. 8). After a predetermined period of time has elapsed from the ON operation of the release switch 14, the control proceeds to step 104, in which a recording medium activating signal outputted from the recording medium drive circuit 41 to the electro-developing recording medium 30 is made ON (reference "S13" in FIG. 8). Namely, the recording medium activating signal is changed from the low level to the high level, so that the activating voltage is applied between the electrostatic information recording medium 31 and the electric charge keeping medium 32. Then, at step 105, it is determined whether or not the exposure calculation has been completed. When the exposure calculation has been completed (reference "S14" in FIG. 8), the procedures necessary for the photographing operation are subsequently carried out in the following steps on the basis of the calculated result.

At step 106, an opening area of the aperture 12a is adjusted in accordance with the calculated result. Note, since the aperture 12a initially has a fully-open area, the adjustment of the aperture 12a is usually carried out such that the fully-open area thereof is made small (reference "S15" in FIG. 8). Also, at step 106, the quick return mirror 21 is changed from the down-position to the up-position (reference "S16" in FIG. 8).

At step 107, it is determined whether or not the quick return mirror 21 has been changed from the down-position to the up-position, and whether or not the adjustment of the aperture 12a has been completed. When the change of the quick return mirror 21 from the down-position to the up-position and the adjustment of the aperture 12a are completed, the control proceeds to step 108, in which the shutter 22 is opened (reference "S17" in FIG. 8), whereby an optical image is focused and formed on the electro-developing recording medium 30 in the above-mentioned manner.

At step 109, it is determined whether or not an exposure period of time, which is designated by the calculated result, has elapsed. When the exposure period of time has elapsed, i.e., when the exposure has been completed, the control proceeds to step 110, in which the shutter 22 is closed (reference "S18" in FIG. 8). After the closing of the shutter 22 is completed, the control proceeds to step 111, in which the quick return mirror 21 is returned from the up-position to the down-position (reference "S19" in FIG. 8), and in which the opening area of the aperture 12a is returned to the fully-open area (reference "S20" in FIG. 8). Then, at step 112, the output voltage of the recording medium activating signal is made OFF (reference "S21" in FIG. 8), i.e., the recording medium activating signal is returned from the high level to the low level.

Namely, the output of the recording medium activating signal to the electro-developing recording medium 30 is at least kept on during the period of time during which the shutter 22 is opened, whereby recording and development of the optical image can be carried out in the electro-developing recording medium 30. As mentioned above, the electric charge keeping medium 32 of the electro-developing recording medium 30 is constituted as a memory type liquid crystal display, and thus the developed image can be held therein even if the output of the recording medium activating signal is stopped.

At step 113, it is determined whether or not the quick return mirror 21 has moved to the initial position or down-position, and whether or not the opening area of the aperture 12a has returned to the initial area or fully-open area. Then, the control proceeds to step 114, in which the driving of the quick return mirror 21 and the aperture 12a are stopped, and thus the routine represented by the flowchart of FIG. 9 is ended.

In the operation as mentioned above, the recording medium activating signal may be outputted just before the exposure is started, i.e., just before the shutter 22 is opened, if necessary. In this case, in the flow chart of FIG. 9, step 104 is positioned between steps 107 and 108.

Figure 10:
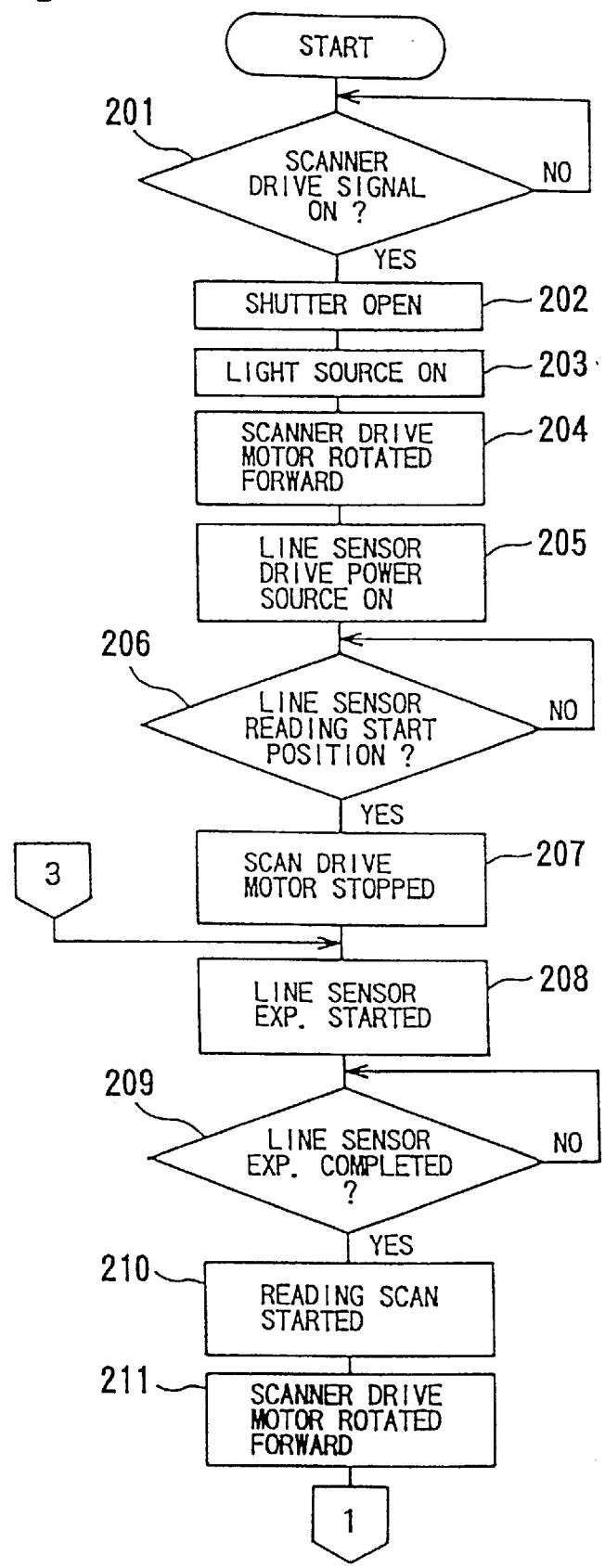
FIG. 10 is a part of a flowchart for explaining a scanning operation of the electronic still video camera shown in FIGS. 1 and 2.
Figure 11:
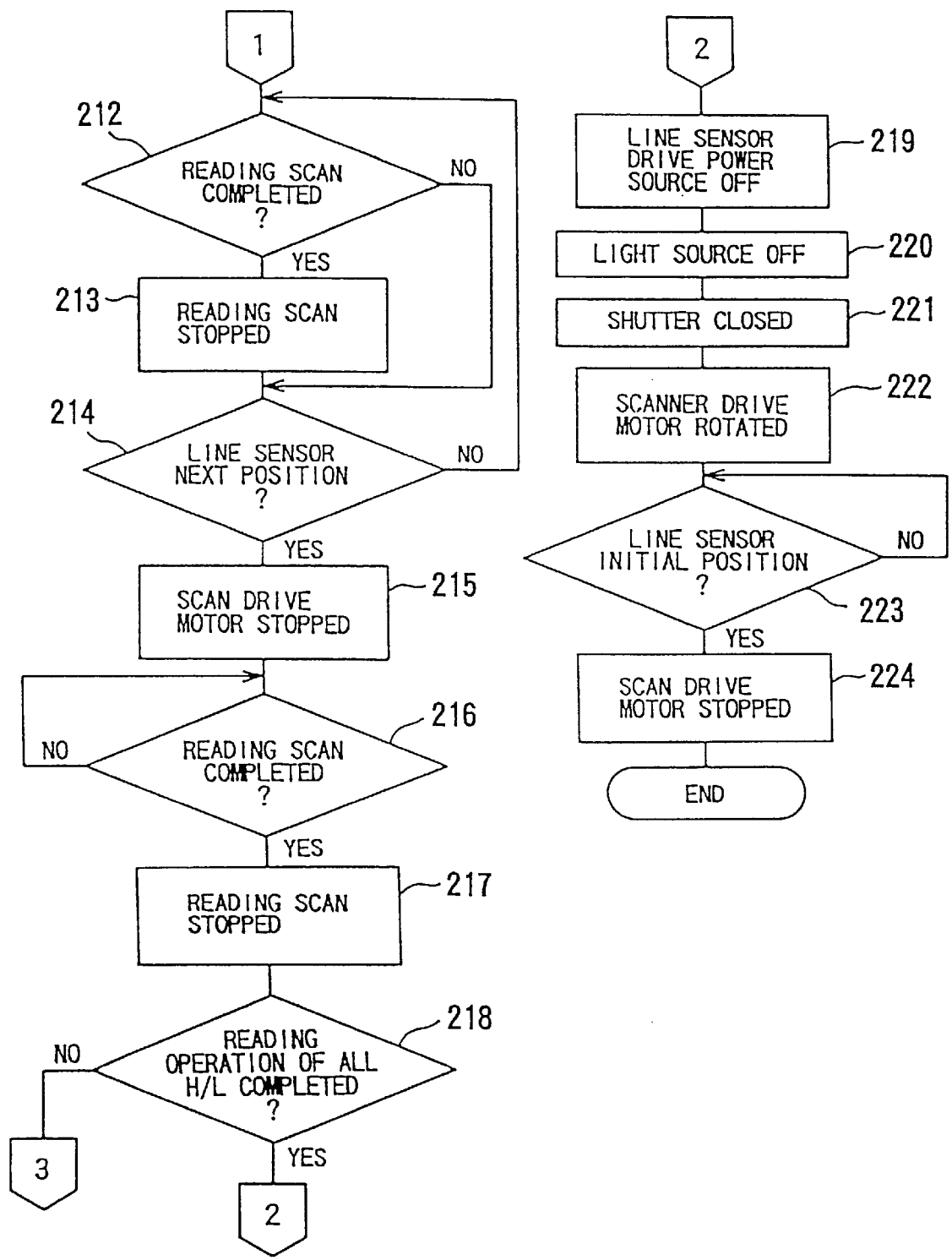
FIG. 11 is a second part of the flowchart (continued from FIG. 10) for explaining a scanning operation of the electronic still video camera shown in FIGS. 1 and 2.

FIGS. 10 and 11 show a flowchart for explaining a scanning operation for optically sensing and reading the developed image held in the electro-developing recording medium 30. With reference to FIG. 8, and FIGS. 10 and 11, the scanning operation will now be explained below.

At step 201, it is determined whether or not the scan start switch 16 has been made ON. If the turn-ON of the scan start switch 16 has been carried out, a scanner drive command signal for executing the scanning operation is made ON (reference "S31" in FIG. 8), and is inputted to the system control circuit.

At step 202, the shutter 22 is opened (reference "S32" in FIG. 8), and the control proceeds to step 203, in which the light source 42 is made ON (reference "S33" in FIG. 8). Then, at step 204, a scanner drive signal outputted from the system control circuit 20 to the scanner drive circuit 46 is changed from the zero level to the positive level (reference "S34" in FIG. 8), so that the scan drive motor 55 is driven in a forward direction due to the drive pulses outputted from the scanner drive circuit 46 thereto, whereby the carriage member 52 of the scanning mechanism 50 starts to move upward from the lower position or removal position toward the scanning start position or image-reading start position (reference "S35" in FIG. 8). Subsequently, at step 205, a line sensor drive power source included in the line sensor drive circuit 47 is made ON (reference "S36" in FIG. 8).

At step 206, it is determined whether or not the carriage member 52 carrying the light source 42 and the line sensor 44 has been moved to the image-reading start position. When the carriage member 52 reaches the image-reading start position, the control proceeds to step 207, in which the scanner drive signal outputted from the system control circuit 20 to the scanner drive circuit 46 is returned from the positive level to the zero level (reference "S37" in FIG. 8), and thus the output of the drive pulses from the scanner drive circuit 46 to the scan drive motor 55 is interrupted to thereby stop the scan drive motor 55 (reference "S38" in FIG. 8). Thus the carriage member 52 carrying the light source 42, and the line sensor 44 is held at the image-reading start position. Note, the standing still of the carriage member 52 at the image-reading start position may be controlled by, for example, counting the driving pulses outputted from the scanner drive circuit 46 to the scan drive motor 55.

At step 208, an exposure of the line sensor 44 is started by the illumination of the light source 42, and thus electric charge accumulation in the line sensor 44 is performed (reference "S39" in FIG. 8). Then, at step 209, it is determined whether or not a given time has elapsed or the electric charge accumulation in the line sensor 44 has been completed. When the electric charge accumulation in the line sensor 44 is completed, the control proceeds to step 210, in which a reading-scan of pixel signals from the line sensor 44, (i.e., a first horizontal-scanning line) is started by the line sensor drive circuit (reference "S40" in FIG. 8).

At step 211, the scanner drive signal outputted from the system control circuit 20 to the scanner drive circuit 46 is changed from the zero level to the positive level (reference "S41" in FIG. 8), so that the scan drive motor 55 is driven in the forward direction due to the drive pulses outputted from the scanner drive circuit 46 thereto. As a result the carriage member 52, and therefore, the light source 42 and the line sensor 44 are moved upward (reference "S42" in FIG. 8).

During the movement of the carriage member 52, it is determined at step 212 whether or not the reading-scan of pixel signals from the line sensor 44 has been completed. If the completion of the reading-scan is confirmed, the control proceeds to step 213, in which the reading-scan of pixel signals from the line sensor 44 is stopped (reference "S43" in FIG. 8). Note that the completion of the reading-scan can be known by, for example, counting reading-clock pulses outputted from the line sensor drive circuit 47 to drive the line sensor 44.

At step 212, if the completion of the reading-scan is not confirmed, the control skips over step 213, and then the control proceeds to step 214, in which it is determined whether or not the carriage member 52 carrying the light source 42 and the line sensor 44 has been moved to a next image-reading position (corresponding to a position at which the pixel signals included in a subsequent horizontal scanning line are read). If the carriage member 52 has not reached the next image-reading position, the control returns to step 212, and the routine including steps 212, 213, and 214 is repeated until the line sensor 44 reaches the next image-reading position.

At step 212, if the completion of the reading-scan is confirmed, the control proceeds to step 213, in which the reading-scan of pixel signals from the line sensor 44 is stopped. Then, the control proceeds to step 214.

At step 214, when it is confirmed that the carriage member 52 carrying the light source 42 and the line sensor 44 has reached the next image-reading position, the control proceeds from step 214 to step 215, in which the scanner drive signal outputted from the system control circuit 20 to the scanner drive circuit 46 is returned from the positive level to the zero level (reference "S44" in FIG. 8), and thus the output of the drive pulses from the scanner drive circuit 46 to the scan drive motor 55 is interrupted, to thereby stop the scan drive motor 55 (reference "S45" in FIG. 8). The the carriage member 52 is thus held at the next image-reading position. Similarly, the standing still of the carriage member 52 at the next image-reading position can be controlled by counting the driving pulses outputted from the scanner drive circuit 46 to the scan drive motor 55.

Then, at step 216, it is again determined whether or not the reading-scan of the single-line of pixel signals from the line sensor 44 has been completed. This is because the control may proceed from step 214 to step 215 without having any access to step 213, i.e., because there may be a case where the reading-scan of the pixel signals from the line sensor 44 is not yet completed even after the carriage member 52 reaches the next image-reading position. When the completion of the reading-scan is confirmed at step 216, the control proceeds to step 217, in which the operation for the reading-scan is stopped.

At step 218, it is determined whether or not the whole of the developed image has been completely read, i.e., the reading-scans have been completed on all of the horizontal-scanning lines defined by intervals of the intermittent movements of the line sensor 44. This determination is made possible by, for example, counting the drive pulses outputted from the scanner drive circuit 46. If the whole of the developed image has not been completely read, the control returns to step 208. Namely, the routine including steps 208 to 218 is repeated until the reading-scans are completed on all of the horizontal-scanning lines. Note, in this first embodiment, all of the horizontal-scanning lines may be a number of about 2,000.

At step 218, when the whole of the developed image has been completely read (reference "S50" in FIG. 8), the control proceeds to step 219, in which the line sensor drive power source included in the line sensor drive circuit 47 is made OFF (reference "51" in FIG. 8). Then, at step 220, the light source 42 is made OFF (reference "S52" in FIG. 8), and at step 221, the shutter 22 is closed (reference "S53" in FIG. 8). Subsequently, at step 222, the scanner drive signal outputted from the system control circuit 20 to the scanner drive circuit 46 is changed from the zero level to the negative level (reference "S54" in FIG. 8), so that the scan drive motor 55 is driven in a reverse direction due to the drive pulses outputted from the scanner drive circuit 46 thereto. As a result, the carriage member 52 of the scanning mechanism 50 starts to move downward toward the lower position or removal position (reference "S51" in FIG. 8).

At step 223, it is determined whether or not the carriage member 52 has been moved to the removal position. When the carriage member 52 reaches the removal position, the control proceeds to step 224, in which the scanner drive signal outputted from the system control circuit 20 to the scanner drive circuit 46 is returned from the negative level to the zero level (reference "S56" in FIG. 8). Thus, the output of the drive pulses from the scanner drive circuit 46 to the scan drive motor 55 is stopped, i.e., the scan drive motor 55 is stopped (reference "S57" in FIG. 8), whereby the carriage member 52 is held at the removal position thereof. The standing still of the carriage member 52 at the removal position may be known by detecting a part of the carriage member 52 with, for example, a photo-interrupter type detector (not shown). Thus, the routine of FIGS. 10 and 11 is ended.

Figure 12:
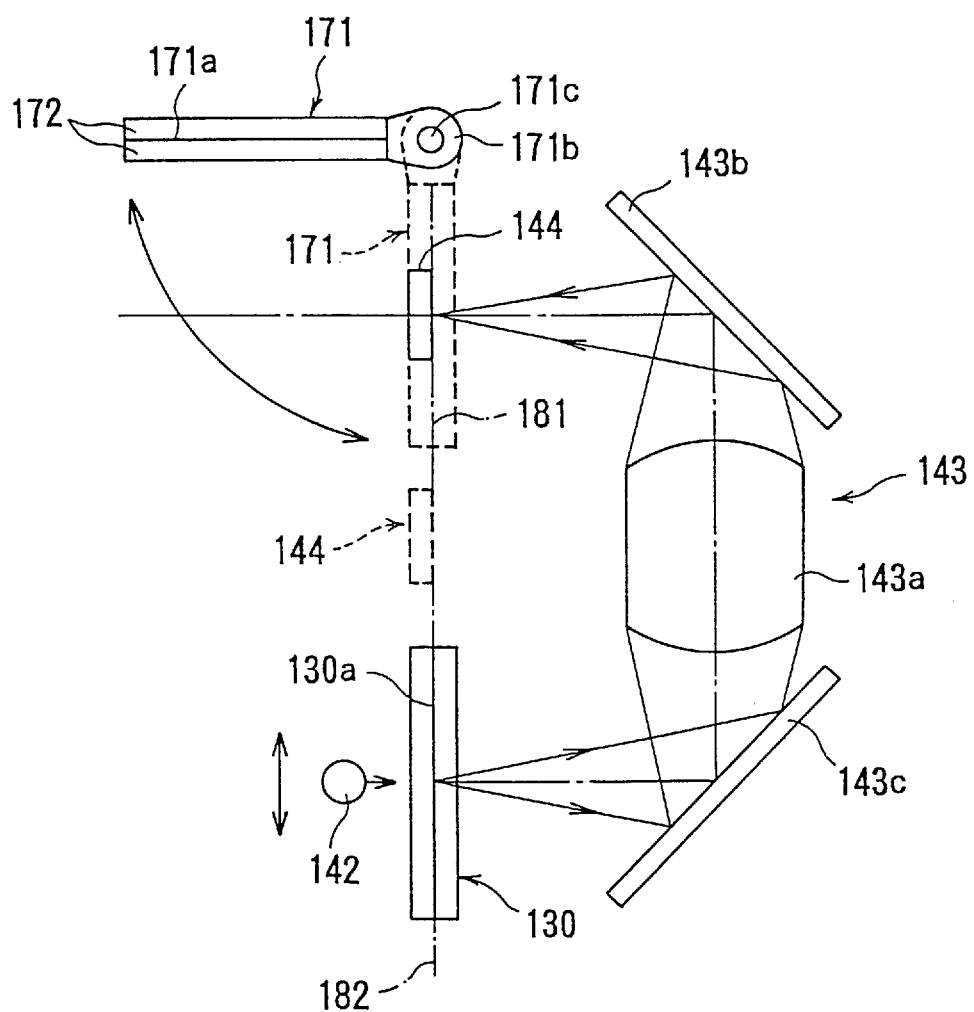
FIG. 12 is a schematic view showing an arrangement of a movable color filter, an electro-developing recording medium, and an optical system forming a part of an image reader or scanning mechanism incorporated in a second embodiment of an electronic color still video camera according to the present invention.

FIG. 12 shows an arrangement of a movable color filter 171, an electro-developing recording medium 130, and an optical system 143 forming a part of an image reader or scanning mechanism incorporated in a second embodiment of an electronic color still video camera according to the present invention. The movable color filter 171 per se is constituted in substantially the same manner as the color filter 71 of the first embodiment. Namely, the color filter 171 comprises a pair of transparent substrates 172, 172, and a three-primary-color film 171*a* sandwiched therebetween.

Figure 13:
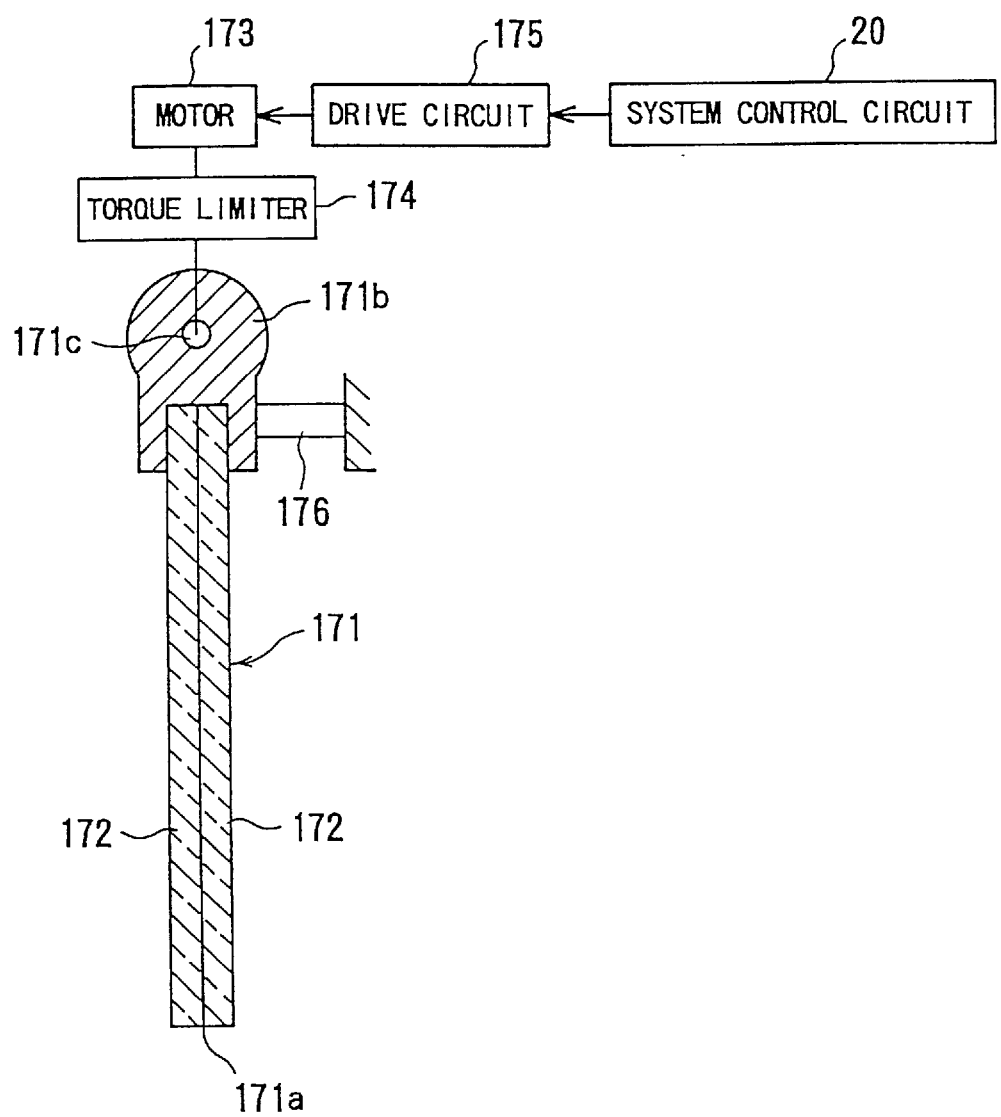
FIG. 13 is a block diagram for driving and moving the movable color filter shown in FIG. 12.

The color filter 171 has an elongated head portion 171*b* fixed to an upper side thereof, and the head portion 171*b* is securely mounted on a rotatable shaft member 171*c*. As shown in FIG. 13, the shaft member 171*c* is connected to a drive motor 173 through the intermediary of a torque limiter 174. The drive motor 173 is driven by a drive circuit 175 which is operated by the system control circuit 20. The color filter 171 is rotatably driven by the drive motor 173 such that it is moved between a vertical position shown by a broken line and a horizontal position shown by a solid line, as shown in FIG. 12.

Usually, the color filter 171 is held at the vertical position. Namely, when an operation other than the scanning operation is executed, the color filter 171 is placed at the vertical position. When the scanning operation is executed, the color filter 171 is removed from the vertical position to the horizontal position, and, after the scanning operation is completed, the color filter 171 is returned from the horizontal position to the vertical position. In FIG. 12, reference 181 indicates a first focal plane on which an optical image is formed by the photographing optical system 12. When the color filter 171 is at the vertical position, the three-primary-color film 171*a* thereof is included in the first focal plane 181.

The electro-developing recording medium 130 is essentially identical with the electro-developing recording medium 30 of the first embodiment, and has an image-forming plane 130*a* in which an image is developed and held. In FIG. 12, reference 182 indicates a second focal plane, and the electro-developing recording medium 130 is arranged such that the image-forming plane 130*a* thereof is included in the second focal plane 182.

Note, in this second embodiment, the first and second focal planes 181 and 182 are consistent with each other. In short, the first focal plane 181 is defined by both the photographing optical system 12 and the optical system 143, and the second focal plane 182 is defined by the optical system 143.

The optical system 143, including an image-forming lens 143*a* and a pair of reflectors 143*b* and 143*c* associated therewith, is essentially identical with the optical system 43 of the first embodiment. Namely, the optical system 143 has a magnification ratio of one to one, and is constituted such that an image formed on one of the first and second focal planes 181 and 182 is focused and formed on the other focal plane.

When the photographing operation is executed, the color filter 171 is placed at the vertical position, so that an optical image focused and formed on the three-primary color film 171 thereof by the photographing optical system 12 is focused and formed on the electro-developing recording medium 130 by the optical system 143, whereby the optical image is recorded and developed thereon.

In FIG. 12, a linear light source 142 and a line sensor 144 are essentially identical with the linear light source 42 and the line sensor 44 of the first embodiment, respectively, and are supported by a carriage member (not shown) corresponding to the carriage member 52. The line sensor 144 is arranged such that a linear light receiving surface thereof is included in the first focal plane 181.

When the scanning operation is initiated, the color filter 171 is moved from the vertical position to the horizontal position. Thus, during the scanning operation, i.e., during the intermittent movement of the carriage member carrying the linear light source 142 and the line sensor 144, the light beams emitted from the linear light source 142 and passing through the electro-developing recording medium 130 are focused on the linear light receiving surface of the line sensor by the optical system 143.

In the scanning operation as shown by the flowchart of FIGS. 10 and 11, the removal of the color filter 171 from the vertical position to the horizontal position may be executed between steps 201 and 202, and the return of the color filter 171 from the horizontal position to the vertical position may be executed after step 224.

In this second embodiment, any correction lens corresponding to the correction lens 43d is not needed because the linear light receiving surface of the line sensor 144 can be placed in the first focal plane 181 due to the removal of the color filter 171 from the vertical position to the horizontal position.

Note, in the second embodiment, the pitch of the lateral arrangement of the color filter elements in each of the lateral rows (FIG. 5) is equal to that of the pixel-arrangement of the one-dimensional CCD line sensor 144, because a magnification of the image focused and formed on the light receiving surface of the line sensor 144 by the image-forming lens 143a is one with respect to the optical image focused and formed on the three-primary-color film 171a of the color filter 171 by the photographing optical system 12.

In the second embodiment shown in FIGS. 12 and 13, whenever the color filter 171 is returned from the horizontal position to the vertical position, the color filter 171 should be precisely and correctly positioned at the vertical position before an optical image can be clearly focused and formed on the three-primary-color film 171a by the photographing optical system 12. To this end, as shown in FIG. 13, a stop 176, which is cooperated with the torque limiter 174, is provided for a precise and correct positioning of the color filter 171 at the vertical position. In particular, the return of the color filter 171 from the horizontal position to the vertical position is somewhat excessively carried out so that the head portion 171b of the color filter 171 can be positively abutted against the positioning stop 176, whereby the precise and correct positioning of the color filter 171 at the vertical position can be ensured. The excess return of the color filter 171 from the horizontal position to the vertical position is made possible due to the existence of the torque limiter 174 for allowing a relative movement between the shaft member 171c and an output shaft of the motor 173.

Figure 14:
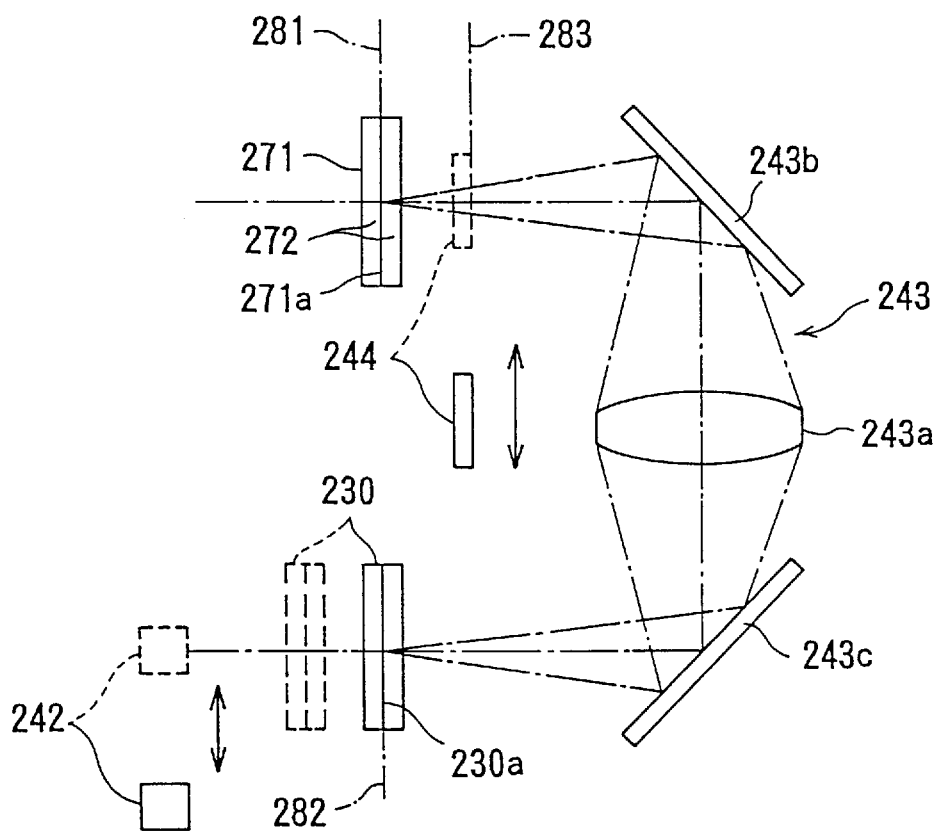
FIG. 14 is a schematic view showing an arrangement of a color filter, a movable electro-developing recording medium, and an optical system forming a part of an image reader or scanning mechanism incorporated in a third embodiment of an electronic color still video camera according to the present invention.

FIG. 14 shows an arrangement of a color filter 271, a movable electro-developing recording medium 230, and an optical system 243 forming a part of an image reader or scanning mechanism incorporated in a third embodiment of an electronic color still video camera according to the present invention. The color filter 271 is immovably provided in the camera body 11, and is essentially identical with the color filter 71 of the first embodiment. Namely, the color filter 271 comprises a pair of transparent substrates 272, 272, and a three-primary-color film 271a sandwiched therebetween. In FIG. 14, reference 281 indicates a first focal plane on which an optical image is formed by the photographing optical system 12, and the color filter 271 is arranged such that the three-primary-color film 271a is included in the first focal plane 281.

Figure 15:
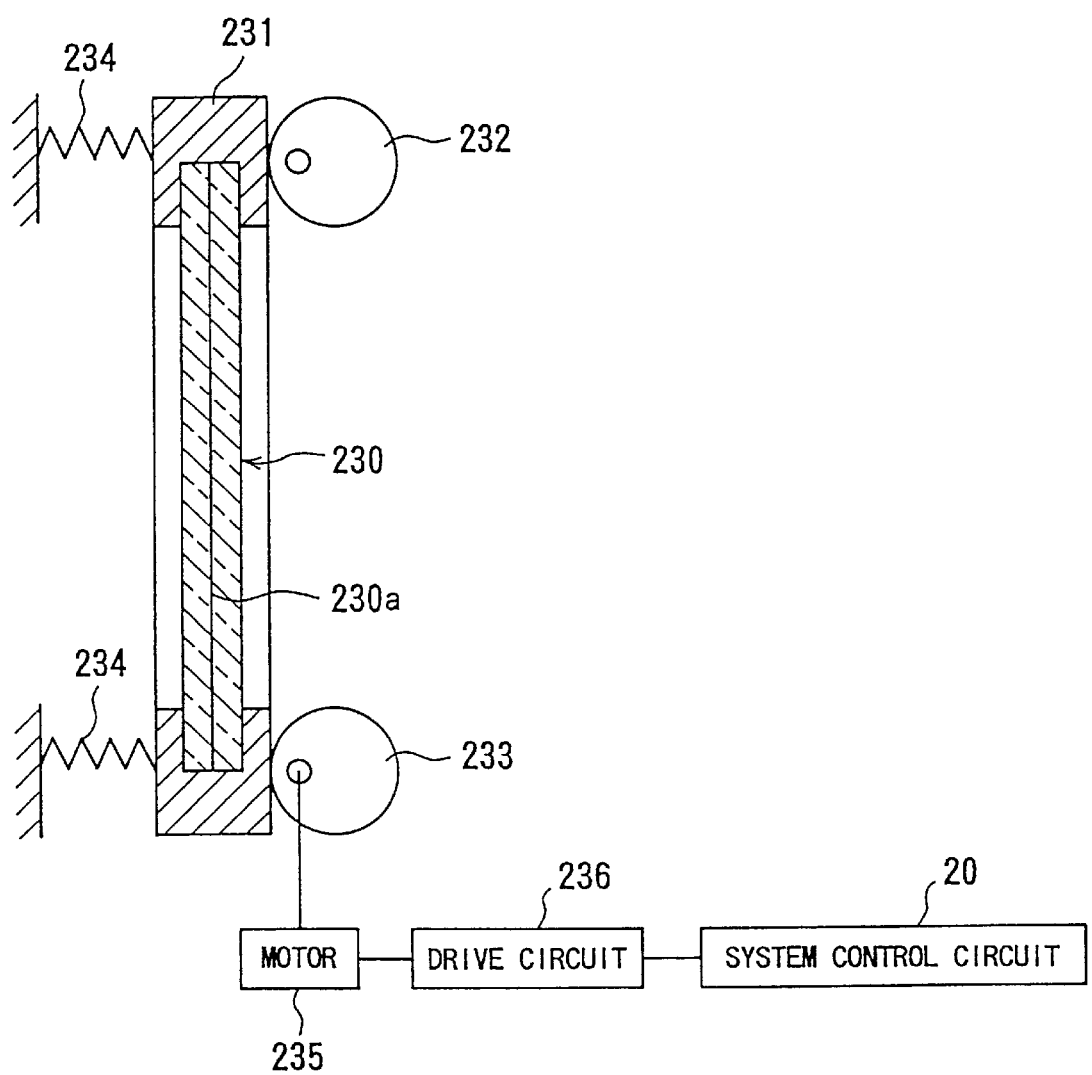
FIG. 15 is a block diagram showing the driving and moving of the movable electro-developing recording medium shown in FIG. 14.

The electro-developing recording medium 230 also is essentially identical with the electro-developing recording medium 30 of the first embodiment except that it is movable between a first position shown by a solid line and a second position shown by a broken line, as shown in FIG. 14. Note, reference 230a indicates an image-forming plane of the electro-developing recording medium 230 in which an image is developed and held. As shown in FIG. 15, the electro-developing recording medium 230 is accommodated in a rectangular frame 231 which is slidably held by a suitable guide means (not shown) such that the frame 231 can be translated in a horizontal direction.

The frame 231 is engaged with an upper eccentric cam 232 and a lower eccentric cam 233, and is resiliently pressed against these cams by a pair of compressed coil springs 234, 234. Shafts of the upper and lower eccentric cams 232 and 233 are operationally connected to each other through the intermediary of, for example, a timing belt (not shown), and the shaft of the lower eccentric cam 233 is coupled to an output shaft of a drive motor 235, whereby the upper and lower eccentric cams 232 and 233 are synchronously rotated. The motor 235 is driven by a drive circuit 236 which is operated by the system control circuit 20. Thus, due to the rotation of the eccentric cams 232 and 233 by the motor 235, the electro-developing recording medium 230 is movable between the first position (solid line) and the second position shown (broken line). Reference 282 indicates a second focal plane, and, when the electro-developing recording medium 230 is at the first position, the image-forming plane 230a thereof is included in the second focal plane 282.

Note, in this third embodiment, the first and second focal planes 281 and 282 are consistent with each other. In short, the first focal plane 281 is defined by both the photographing optical system 12 and the optical system 243, and the second focal plane 282 is defined by the optical system 243.

The optical system 243 including an image-forming lens 243a, and a pair of reflectors 243b and 243c associated therewith is essentially identical with the optical system 43 of the first embodiment. Namely, the optical system 243 has a magnification ratio of one to one, and is constituted such that an image formed on one of the first and second focal planes 281 and 282 is focused and formed on the other focal plane.

When the photographing operation is executed, the electro-developing recording medium 230 is placed at the first position (solid line), so that an optical image focused and formed on the color filter 271 by the photographing optical system 12 is focused and formed on the electro-developing recording medium 230 by the optical system 243, whereby the optical image is recorded and developed thereon.

In FIG. 14, a linear light source 242 and a line sensor 244 are essentially identical with the linear light source 42 and the line sensor 44 of the first embodiment, respectively, and are supported by a carriage member (not shown) corresponding to the carriage member 52. The line sensor 244 is arranged such that a linear light receiving surface thereof is included in a third focal plane 283.

When the scanning operation is initiated, the electro-developing recording medium 230 is moved from the first position (solid line) to the second position (broken line) by the synchronous rotation of the eccentric cams 232 and 233, so that the first focal plane 281 becomes consistent with the third focal plane 283. Thus, during the scanning operation, i.e., during the intermittent movement of the carriage member carrying the linear light source 242 and the line sensor 244, the light beams emitted from the linear light source 242 and passing through the electro-developing recording medium 230 are focused on the linear light receiving surface of the line sensor by the optical system 243.

In the scanning operation as shown by the flowchart of FIGS. 10 and 11, the movement of the electro-developing recording medium 230 from the first position (solid line) to the second position (broken line) may be executed between steps 201 and 202, and the return of the electro-developing recording medium 230 from the second position (broken line) to the first position (solid line) may be executed after step 224.

Similar to the second embodiment shown in FIGS. 12 and 13, in the third embodiment, any correction lens corresponding to the correction lens 43d is not needed, because the first focal plane 281 can be shifted to the third focal plane 283 due to the movement of the electro-developing recording plane 230 from the first position to the second position, until the first and third focal planes 281 and 283 are consistent with each other.

Note, in the third embodiment, since a magnification of the image focused and formed on the light receiving surface of the line sensor 244 by the image-forming lens 243a is not one with respect to the optical image focused and formed on the three-primary-color film 271a of the color filter 271 by the photographing optical system 12, due to the movement of the electro-developing recording medium 230 from the first position (solid line) to the second position (broken line), the pitch of the lateral arrangement of the color filter elements in each of the lateral rows (FIG. 5) and/or the pitch of the pixel-arrangement of the one-dimensional CCD line sensor 244 are arranged and revised so that a consistency and correspondence can be obtained therebetween.

Figure 16:
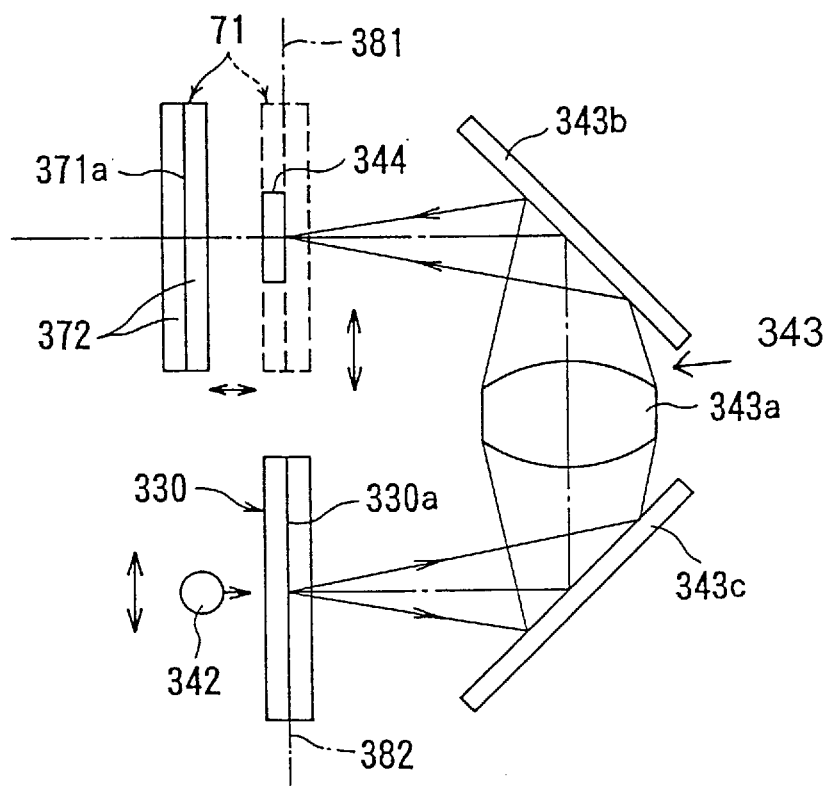
FIG. 16 is a schematic view showing an arrangement of another movable color filter, an electro-developing recording medium, and an optical system forming a part of an image reader or scanning mechanism incorporated in a fourth embodiment of an electronic color still video camera according to the present invention.

FIG. 16 shows an arrangement of another movable color filter 371, an electro-developing recording medium 330, and an optical system 343 forming a part of an image reader or scanning mechanism incorporated in a fourth embodiment of an electronic color still video camera according to the present invention. The movable color filter 371 per se is constituted in substantially the same manner as the color filter 71 of the first embodiment. Namely, the color filter 371 comprises a pair of transparent substrates 372, 372, and a three-primary-color film 371a sandwiched therebetween.

Figure 17:
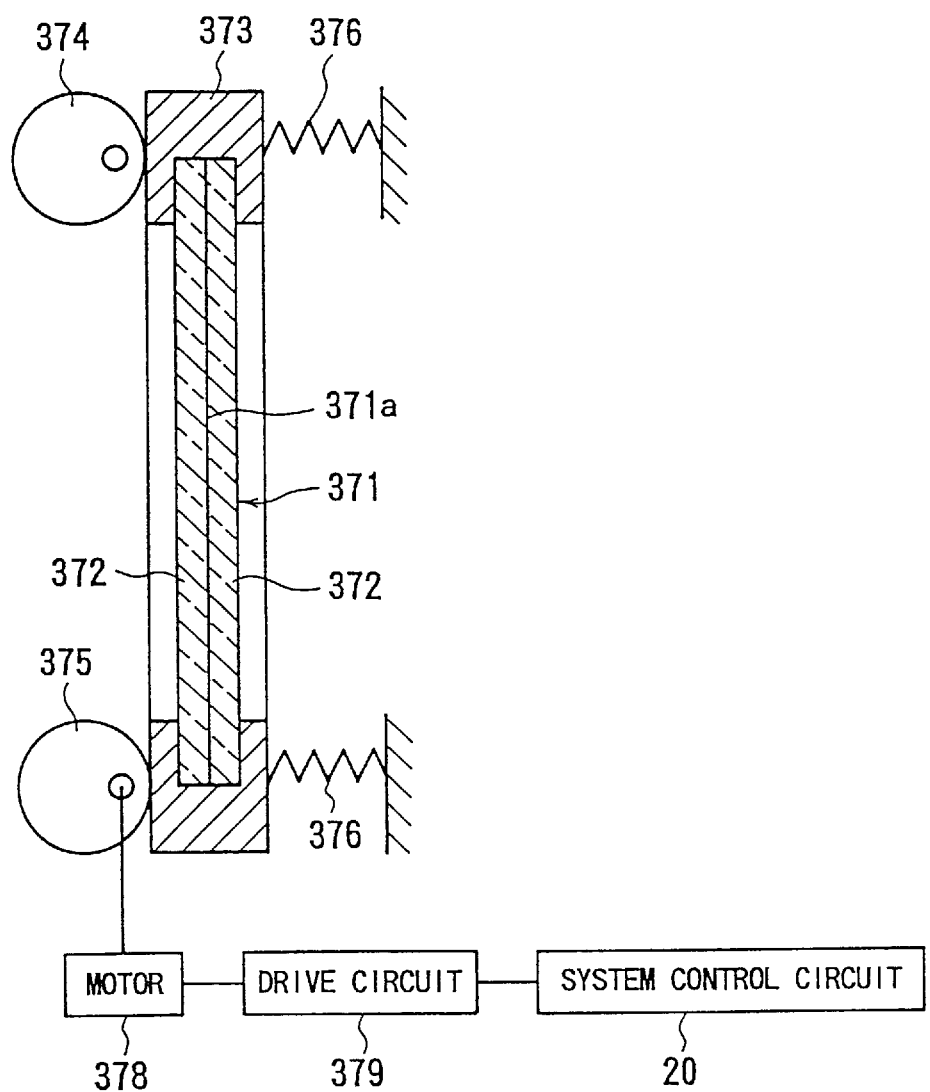
FIG. 17 is a block diagram for driving and moving the movable color filter shown in FIG. 16.

As shown in FIG. 17, the color filter 371 is accommodated in a rectangular frame 373 which is slidably held by a suitable guide means (not shown) such that the frame 373 is translated in a horizontal direction. The frame 373 is engaged with an upper eccentric cam 374 and a lower eccentric cam 375, and is resiliently pressed against these cams by a pair of compressed coil springs 376, 376. Shafts of the upper and lower eccentric cams 374 and 375 are operationally connected to each other through the intermediary of, for example, a timing belt (not shown), and the shaft of the lower eccentric cam 375 is coupled to an output shaft of a drive motor 378, whereby the upper and lower eccentric cams 374 and 375 are synchronously rotated. The motor 378 is driven by a drive circuit 379 which is operated by the system control circuit 20.

Thus, due to the rotation of the eccentric cams 374 and 375 by the motor 378, the color filter 371 is movable between a first position shown by a broken line and a second position shown by a solid line, as shown in FIG. 16. Reference 381 indicates a first focal plane on which an optical image is focused and formed by the photographing optical system 12, and, when the color filter 371 is at the first position (broken line), the three-primary color film 371a is included in the first focal plane 381.

The electro-developing recording medium 330 is essentially identical with the electro-developing recording medium 30 of the first embodiment, and has an image-forming plane 330a in which an image is developed and held. In FIG. 16, reference 382 indicates a second focal plane, and the electro-developing recording medium 330 is arranged such that the image-forming plane 330a thereof is included in the second focal plane 382.

Note, in this fourth embodiment, the first and second focal planes 381 and 382 are consistent with each other. In short, the first focal plane 381 is defined by both the photographing optical system 12 and the optical system 343, and the second focal plane 382 is defined by the optical system 343.

The optical system 343 is essentially identical with the optical system 43 of the first embodiment, and includes an image-forming lens 343a, and a pair of reflectors 343b and 343c associated therewith. Namely, the optical system 343 has a magnification ratio of one to one, and is constituted such that an image formed on one of the first and second focal planes 381 and 382 is focused and formed on the other focal plane.

When the photographing operation is executed, the color filter 371 is placed at the first position (broken line), so that an optical image focused and formed on the three-primary color film 371 thereof by the photographing optical system 12 is focused and formed on the electro-developing recording medium 330 by the optical system 343, whereby the optical image is recorded and developed thereon.

In FIG. 16, a linear light source 342 and a line sensor 344 are essentially identical with the linear light source 42 and the line sensor 44 of the first embodiment, respectively, and are supported by a carriage member (not shown) corresponding to the carriage member 52. The line sensor 344 is arranged such that a linear light receiving surface thereof is included in the first focal plane 381.

When the scanning operation is initiated, the color filter 371 is moved from the first position (broken line) to the second position (solid) line. Thus, during the scanning operation, i.e., during the intermittent movement of the carriage member carrying the linear light source 342 and the line sensor 344, the light beams emitted from the linear light source 342 and passing through the electro-developing recording medium 330 are focused on the linear light receiving surface of the line sensor by the optical system 343.

In the scanning operation as shown by the flowchart of FIGS. 10 and 11, the removal of the color filter 371 from the first position (broken line) to the second position (solid line) may be executed between steps 201 and 202, and the return of the color filter 371 from the second position (solid line) to the first position (broken line) may be executed after step 224.

Similar to the second and third embodiments as mentioned above, in this fourth embodiment, any correction lens corresponding to the correction lens 43d is not needed because the linear light receiving surface of the line sensor 344 can be placed in the first focal plane 381 due to the removal of the color filter 371 from the first position (broken line) to the second position (solid line).

Note, in the fourth embodiment, the pitch of the lateral arrangement of the color filter elements in each of the lateral rows (FIG. 5) is equal to that of the pixel-arrangement of the one-dimensional CCD line sensor 344, because a magnification of the image focused and formed on the light receiving surface of the line sensor 344 by the image-forming lens 343a is one with respect to the optical image focused and formed on the three-primary-color film 371a (focal plane 381) of the color filter 371 by the photographing optical system 12.

Figure 18:
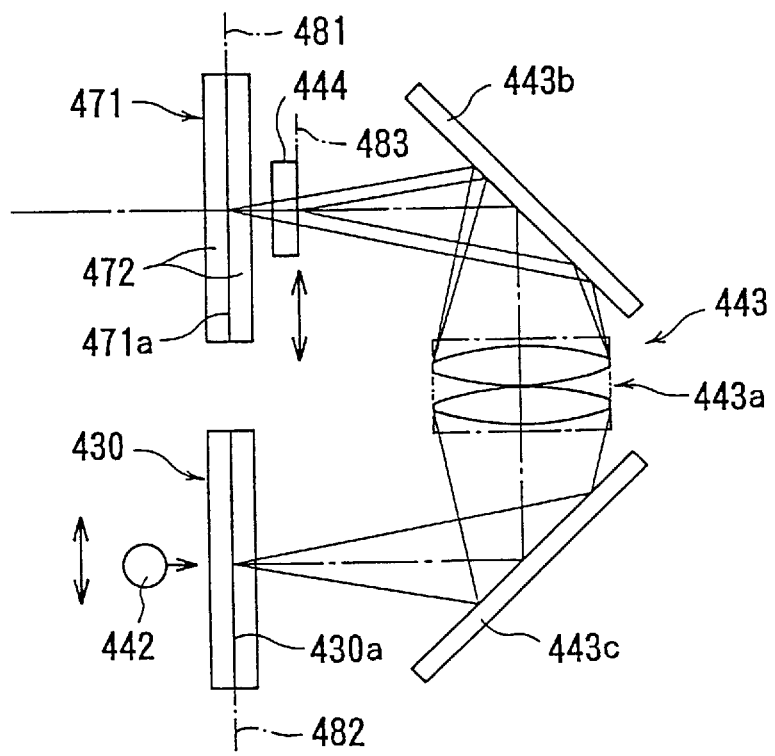
FIG. 18 is a schematic view showing an arrangement of a color filter, an electro-developing recording medium, and a zoom-lens type optical system forming a part of an image reader or scanning mechanism incorporated in a fifth embodiment of an electronic color still video camera according to the present invention.

FIG. 18 shows an arrangement of a color filter 471, an electro-developing recording medium 430, and an zoom-lens type optical system 443 forming a part of an image reader or scanning mechanism incorporated in a fifth embodiment of an electronic color still video camera according to the present invention. The color filter 471 is essentially identical with the color filter 71 of the first embodiment, and comprises a pair of transparent substrates 472, 472, and a three-primary-color film 471a sandwiched therebetween. Reference 481 indicates a first focal plane on which an optical image is focused and formed by the photographing optical system 12. The color filter 471 is arranged such that the three-primary-color film 471a thereof is included in the first focal plane 481. Also, the electro-developing recording medium 430 is essentially identical with the electro-developing recording medium 30 of the first embodiment, and includes an image-forming plane 430a in which an image is developed and held. Reference 482 indicates a second focal plane, and the electro-developing recording medium 430 is arranged such that the image-forming plane 430a thereof is included in the second focal plane 482.

Furthermore, in FIG. 18, a linear light source 442 and a line sensor 444 are essentially identical with the linear light source 42 and the line sensor 44 of the first embodiment, respectively, and are supported by a carriage member (not shown) corresponding to the carriage member 52. The line sensor 444 is arranged such that a linear light receiving surface thereof is included in a third focal plane 483.

Figure 19:
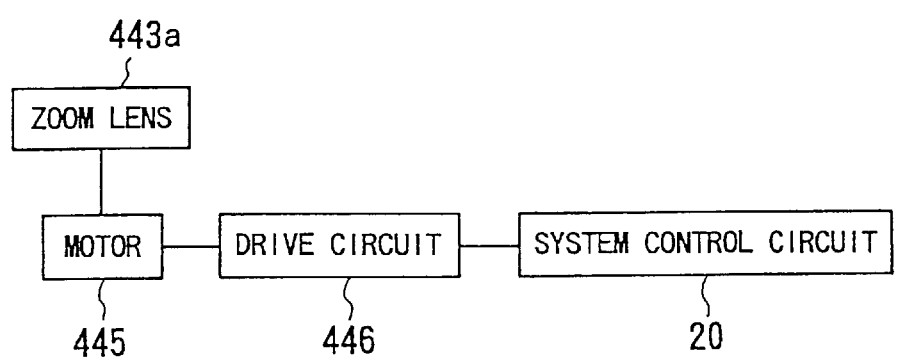
FIG. 19 is a block diagram showing the driving of a zoom-lens assembly of the zoom-lens type optical system shown in FIG. 18.

The zoom-lens type optical system 443 includes a zoom-lens assembly 443a, and a pair of reflectors 443b and 443c associated therewith, and functions in substantially the same manner as the optical system 43 of the first embodiment. As shown in FIG. 19, the zoom-lens assembly 443a is operationally connected to an output shaft of a drive motor 445 which is driven by a drive circuit 446 which is operated by the system control circuit 20. By driving the motor 445, the zoom-lens assembly 443a can be set between at least a first set position and a second set position. When the zoom-lens assembly 443a is set at the first set position, an image placed on the first focal plane 481 is focused and formed on the second focal plane 482, and, when the zoom-lens assembly 443a is set at the second set position, an image placed on the second focal plane 482 is focused and formed on the third focal plane 483.

Note, in this fifth embodiment, the first and second focal planes 481 and 482 are consistent with each other. In short, the first focal plane 481 is defined by both the photographing optical system 12 and the zoom-lens type optical system 443 in which the zoom-lens assembly 443a is set at the first set position; the second focal plane 482 is defined by the zoom-lens type optical system 443 in which the zoom-lens assembly 443a is set at the first set position; and the third focal plane 483 is defined by the zoom-lens type optical system 443 in which the zoom-lens assembly 443a is set at the second set position.

When the photographing operation is executed, the zoom-lens assembly 443a is set at the first position, whereby an optical image focused and formed on the three-primary-color film 471a of the color filter 471 by the photographing optical system 12 is focused and formed on the electro-developing recording medium 430 by the optical system 443, whereby the optical image is recorded and developed thereon.

When the scanning operation is initiated, the zoom-lens assembly 443a is set at the second position. Thus, during the scanning operation, i.e., during the intermittent movement of the carriage member carrying the linear light source 442 and the line sensor 444, the light beams emitted from the linear light source 442 and passing through the electro-developing recording medium 430 are focused on the linear light receiving surface of the line sensor by the optical system 443.

In the scanning operation as shown by the flowchart of FIGS. 10 and 11, the setting of the zoom-lens assembly 443a at the second position may be executed between between steps 201 and 202, and the resetting of the zoom-lens assembly 443a at the first position may be executed after step 224.

Similar to the second, and third, fourth embodiments, in this fifth embodiment, any correction lens corresponding to the correction lens 43d is not needed because the linear light receiving surface of the line sensor 444 is placed in the third focal plane 483 which is defined by the zoom-lens assembly 443a moved and set from the first position to the second position.

Note, in the fifth embodiment, since a magnification of the image focused and formed on the light receiving surface of the line sensor 444 by the zoom-lens assembly 443a is not one with respect to the optical image focused and formed on the three-primary-color film 471a of the color filter 471 by the photographing optical system 12, due to the setting of the zoom-lens assembly 443a at the second position, the pitch of the lateral arrangement of the color filter elements in each of the lateral rows (FIG. 5) and/or the pitch of the pixel-arrangement of the one-dimensional CCD line sensor 444 are arranged and revised so that a consistency and correspondence can be obtained therebetween.

According to the present invention, the image reader or scanning mechanism can be compactly arranged together with the color filter and the electro-developing recording medium, because the linear light emitting surface of the light source and the linear light receiving surface of the line sensor are oriented in the same direction, and because the optical system opposed thereto is constituted such that the light beams passing through the color filter are directed to the electro-developing recording medium, and such that the light beams emitted from the light source are directed to the line sensor.

Note that the electro-developing recording medium (30, 130, 230, 330, 430) is not restricted to the structure described above, and may be any other structure by which an image is electronically developed.

The present invention is not restricted to a single-lens reflex camera described above, but can be applied to a lens shutter camera. Note that, when the present invention is applied to the lens shutter camera, the shutter (22) need not be provided, as in the above described embodiment.

A single lens, a micro-lens array, a rod lens array and so on may be used for the scanner optical system (43, 143, 243, 343, 443).

The line sensor (44, 144, 244, 344, 444) may be disposed in such a manner that a light beam reflected by the electro-developing recording medium (30, 130, 230, 330, 430) is sensed.

Finally, it will be understood by those skilled in the art that the foregoing description is of preferred embodiments of the disclosed electronic still video camera, and that various changes and modifications may be made to the present invention without departing from the spirit and scope thereof.

The present disclosure relates to subject matter contained in Japanese Patent Application No. 7-30129 (filed on Jan.

26, 1995), which is expressly incorporated herein, by reference, in its entirety.

I claim:

1. An electronic color still video camera having an electro-developing recording medium and a color filter, comprising:

a photographing optical system that forms an optical image on said color filter;

an optical system that forms the optical image, formed on said color filter, in an image-forming plane of said electro-developing recording medium to record and develop the optical image in said electro-developing recording medium; and an image-sensing device that optically senses the recorded and developed image to obtain image data from the recorded and developed image of said electro-developing recording medium;

said image-sensing device including a light source having a light emitting surface positioned in a plane parallel with the image-forming plane of said electro-developing recording medium such that light beams emitted from said light emitting surface of said light source are perpendicularly directed to and are passed through said image-forming plane of said electro-developing recording medium, and an image sensor having a light receiving surface oriented in a same direction as a direction of said light emitting surface of said light source the light beams passing through said image-forming plane of said electro-developing recording medium being directed to said light receiving surface of said image sensor through said optical system; and a corrector that ensures that the light beams, directed to said light-receiving surface of said image sensor through said optical system, are focused at said light receiving surface of said image sensor.

2. An electronic color still video camera as set forth in claim 1, wherein said color filter is positioned on an extension of said image plane of said electro-developing recording medium, and said optical system has a magnification ratio of one.

3. An electronic color still video camera as set forth in claim 1, wherein said light source and said image sensor are associated with each other so as to be moved as a unit with respect to said electro-developing recording medium, light beams emitted from said light emitting surface of said light source in association with movement of said light source and said image sensor are perpendicularly directed to the image forming plane of said electro-developing recording medium and pass through the image-forming plane of said electro-developing recording medium before being directed to and focused on said light receiving surface of said image sensor by said optical system and said corrector.

4. An electronic color still video camera as set forth in claim 3, wherein said image sensor of said image-sensing device comprises a line sensor, and said light source of said image-sensing device comprises a linear light source, said line sensor and said linear light source being associated with each other and being relatively movable with respect to said electro-developing recording medium, whereby said image-forming plane is scanned with the light beams emitted from said linear light source associated with said line sensor.

5. An electronic color still video camera as set forth in claim 4, further comprising:

a carriage member, supporting said line sensor and said linear light source, said carriage member being movable with respect to said electro-developing recording medium, and said optical system being fixedly positioned with respect to said carriage member.

6. An electronic color still video camera as set forth in claim 4, wherein said line sensor is arranged such that said light receiving surface is in a plane adjacent to said color filter.

7. An electronic color still video camera as set forth in claim 6, wherein said corrector comprises an optical lens element provided on said line sensor, said corrector cooperating with said optical system and ensuring that the light beams passing through said image-forming plane of said electro-developing recording medium are focused at said light receiving surface of said image sensor.

8. An electronic color still video camera as set forth in claim 6, wherein said corrector comprises a shifting mechanism that shifts said electro-developing recording medium to ensure that the light beams passing through said image-forming plane of said electro-developing recording medium are focused at said light receiving surface of said image sensor.

9. An electronic color still video camera as set forth in claim 6, wherein said corrector comprises a zoom-lens system incorporated in said optical system to ensure that the light beams passing through said image-forming plane of said electro-developing recording medium are focused at said light receiving surface of said image sensor.

10. An electronic color still video camera as set forth in claim 4, wherein said line sensor is positioned so that said light receiving surface is in a plane in which said color filter is positioned, said electronic still video camera further comprising a removal mechanism that removes said color filter from a position at which the optical image is formed on said filter by said photographing means so that said line sensor is not interfered with by said color filter, while said image-forming plane of said electro-developing recording medium is scanned with the light beams emitted from said linear light source associated with said line sensor.

11. An electronic color still video camera as set forth in claim 1, wherein said electro-developing recording medium comprises an electrostatic information recording medium and an electric charge keeping medium.

12. An electronic still video camera as set forth in claim 11, wherein said electrostatic information recording medium includes a photoconducting layer and an inorganic oxide material layer, and said electric charge keeping medium includes a liquid crystal display.

13. An electronic color still video camera comprising:

a first optical system for focusing and forming a first optical image on a first plane;

a second optical system for focusing and forming said first optical image as a second optical image on a second plane;

a color filter positioned in said first plane;

an electro-developing recording medium positioned in said second plane such that said second optical image is recorded and developed in said recording medium; and an image sensor, said image sensor being movable in said first plane for electronically sensing and reading from the recorded and developed image of said electro-developing recording medium through said second optical system;

said color filter being movable out of said first plane during the sensing and reading of the recorded and developed image of said electro-developing recording medium by said image sensor.

14. The electronic color still video camera according to claim 13, said first plane and said second plane comprising a single plane.

15. An electronic color still video camera comprising:
- a first optical system for focusing and forming a first optical image on a first plane;
- a second optical system for focusing and forming said first optical image as a second optical image on a second plane;
- a color filter positioned in said first plane;
- an electro-developing recording medium positioned in said second plane such that said second optical image is recorded and developed in said recording medium; and
- an image sensor said image sensor being movable in a third plane for electronically sensing and reading from the recorded and developed image of said electro-developing recording medium through said second optical system,
- wherein said image sensor includes a correction lens for ensuring that an optical image of the recorded and developed image of said electro-developing recording medium is focused and formed on a light receiving surface of said image sensor.

16. The electronic color still video camera according to claim 15, said correction lens being mounted for movement together with said image sensor.

17. An electronic color still video camera comprising:
- a first optical system for focusing and forming a first optical image on a first plane;
- a second optical system for focusing and forming said first optical image as a second optical image on a second plane;
- a color filter positioned in said first plane;
- an electro-developing recording medium positioned in said second plane such that said second optical image is recorded and developed in said recording medium; and
- an image sensor, said image sensor being movable in a third plane for electronically sensing and reading from the recorded and developed image of said electro-developing recording medium through said second optical system,
- wherein said electro-developing recording medium is movable out of said second plane such that an optical image of the recorded and developed image of said electro-developing recording medium is focused and formed on a light receiving surface of said image sensor.

18. An electronic color still video camera comprising:
- a first optical system for focusing and forming a first optical image on a first plane;
- a second optical system for focusing and forming said first optical image as a second optical image on a second plane;
- a color filter positioned in said first plane;
- an electro-developing recording medium positioned in said second plane such that said second optical image is recorded and developed in said recording medium; and
- an image sensor, image sensor being movable in a third plane for electronically sensing and reading from the recorded and developed image of said electro-developing recording medium through said second optical system,
- wherein said second optical system is adjustable so that an optical image of the recorded and developed image of said electro-developing recording medium is focused and formed on a light receiving surface of said image sensor.

19. The electronic color still video camera according to claim 18, said second optical system positioned along an optical path between said color filter and said electro-developing recording medium.

20. The electronic color still video camera according to claim 18, said first plane and said second plane comprising a single plane.

* * * * *